(12) United States Patent
Ogawa et al.

(10) Patent No.: US 9,761,228 B2
(45) Date of Patent: Sep. 12, 2017

(54) VOICE RECOGNITION SYSTEM AND VOICE RECOGNITION DEVICE

(71) Applicant: Mitsubishi Electric Corporation, Chiyoda-ku (JP)

(72) Inventors: Isamu Ogawa, Chiyoda-ku (JP); Toshiyuki Hanazawa, Chiyoda-ku (JP); Tomohiro Narita, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 61 days.

(21) Appl. No.: 14/649,128

(22) PCT Filed: Nov. 20, 2013

(86) PCT No.: PCT/JP2013/081288
§ 371 (c)(1),
(2) Date: Jun. 10, 2016

(87) PCT Pub. No.: WO2014/129033
PCT Pub. Date: Aug. 28, 2014

(65) Prior Publication Data
US 2016/0275950 A1     Sep. 22, 2016

(30) Foreign Application Priority Data
Feb. 25, 2013   (JP) .................. 2013-034574

(51) Int. Cl.
*G10L 15/30*     (2013.01)
*G10L 15/32*     (2013.01)
(Continued)

(52) U.S. Cl.
CPC .............. *G10L 15/32* (2013.01); *G10L 15/10* (2013.01); *G10L 15/183* (2013.01); *G10L 15/30* (2013.01); *G10L 15/34* (2013.01); *G10L 25/51* (2013.01)

(58) Field of Classification Search
CPC ....... G10L 15/30; G10L 15/28; G10L 15/285; G10L 15/32; G10L 15/34
See application file for complete search history.

(56) References Cited

U.S. PATENT DOCUMENTS 5,596,679 A * 1/1997 Wang .................. G10L 15/08
                                                          704/232
5,642,519 A * 6/1997 Martin ............... G10L 15/1822
                                                          704/255
(Continued)

FOREIGN PATENT DOCUMENTS

JP      2004-245938 A    9/2004
JP      2009-237439 A    10/2009
(Continued)

OTHER PUBLICATIONS

International Search Report dated Feb. 4, 2014 in PCT/JP13/081288 Filed Nov. 20, 2013.

*Primary Examiner* — Eric Yen
(74) *Attorney, Agent, or Firm* — Oblon, McClelland, Maier & Neustadt, L.L.P.

(57) ABSTRACT

There are provided a recognition result candidate comparator 205 that compares a plurality of server-side voice recognition result candidates received by a receiver 204, to detect texts having a difference, and a recognition result integrator 206 that integrates a client-side voice recognition result candidate and a server-side voice recognition result candidate on the basis of the client-side voice recognition result candidate, the server-side voice recognition result candidate, and a detection result provided by the recognition result candidate comparator 205, to decide a voice recognition result.

10 Claims, 20 Drawing Sheets

(51) Int. Cl.
*G10L 15/34* (2013.01)
*G10L 25/51* (2013.01)
*G10L 15/10* (2006.01)
*G10L 15/183* (2013.01)

(56) References Cited

U.S. PATENT DOCUMENTS

| | | | | |
|---|---|---|---|---|
| 5,864,805 A * | 1/1999 | Chen | ............... | G10L 15/22 704/235 |
| 6,064,959 A * | 5/2000 | Young | ............... | G10L 15/22 704/251 |
| 6,671,669 B1 * | 12/2003 | Garudadri | ............... | G10L 15/32 704/255 |
| 6,754,629 B1 * | 6/2004 | Qi | ............... | G10L 15/32 704/238 |
| 8,219,407 B1 * | 7/2012 | Roy | ............... | G10L 15/22 704/255 |
| 8,949,266 B2 * | 2/2015 | Phillips | ............... | G10L 15/30 704/7 |
| 9,275,635 B1 * | 3/2016 | Beaufays | ............... | G10L 15/32 |
| 9,443,518 B1 * | 9/2016 | Gauci | ............... | G06F 17/28 |
| 2001/0020837 A1 * | 9/2001 | Yamashita | ............... | B25J 13/003 318/567 |
| 2002/0055841 A1 * | 5/2002 | Bi | ............... | G10L 15/10 704/246 |
| 2002/0138265 A1 * | 9/2002 | Stevens | ............... | G10L 15/22 704/251 |
| 2002/0193991 A1 * | 12/2002 | Bennett | ............... | G10L 15/32 704/247 |
| 2003/0004717 A1 * | 1/2003 | Strom | ............... | G10L 15/197 704/240 |
| 2003/0120486 A1 * | 6/2003 | Brittan | ............... | G10L 15/32 704/231 |
| 2003/0130849 A1 * | 7/2003 | Durston | ............... | G10L 15/22 704/270 |
| 2004/0010409 A1 * | 1/2004 | Ushida | ............... | G10L 15/30 704/246 |
| 2009/0248415 A1 * | 10/2009 | Jablokov | ............... | G10L 15/30 704/251 |
| 2010/0131277 A1 * | 5/2010 | Nakano | ............... | G10L 15/22 704/270 |
| 2011/0015928 A1 * | 1/2011 | Odell | ............... | G10L 15/30 704/257 |
| 2012/0179471 A1 * | 7/2012 | Newman | ............... | G10L 15/30 704/270.1 |
| 2013/0073286 A1 * | 3/2013 | Bastea-Forte | ............... | G10L 15/22 704/244 |
| 2013/0132089 A1 * | 5/2013 | Fanty | ............... | G10L 21/00 704/270 |
| 2013/0185072 A1 | 7/2013 | Huang et al. | | |
| 2014/0304205 A1 * | 10/2014 | Fastow | ............... | G10L 15/32 706/47 |

FOREIGN PATENT DOCUMENTS

| | | |
|---|---|---|
| JP | 2010-85536 A | 4/2010 |
| JP | 4902617 B2 | 3/2012 |
| WO | 2011/163538 A1 | 12/2011 |

\* cited by examiner

FIG.7

| Voice Operation Command | Utterance Rule of Input Voice |
|---|---|
| (Mêru (Mail)) | Command + Free Sentence |
| (Mokutekichi (Destination)) | Command + Place Name |
| : | : |

| Voice Operation Command | Voice Data |
|---|---|
| (Mêru (Mail)) | Voice Data(1) |
| (Mêru (Mail)) | Voice Data(2) |
| : | : |

601 — Voice Operation Command
602 — Voice Data
600

FIG.12

| Voice Operation Command | Correction Candidate |
|---|---|
| (Mêru (Mail)) | (Meiru) |
| (Mêru (Mail)) | (Mieru) |
| : | : |

701 — Voice Operation Command
702 — Correction Candidate
700

FIG.15

| Voice Operation Command | Utterance Rule of Input Voice |
|---|---|
| (San Ni Mêru (Mail)) | Proper Noun + Command + Free Sentence |
| (San E Mêru (Mail)) | Proper Noun + Command + Free Sentence |
| (E Mêru (Mail)) | Proper Noun + Command + Free Sentence |
| : | : |

901 — Voice Operation Command
902 — Utterance Rule of Input Voice
900

FIG.18

| Voice Operation Command | Utterance Rule of Input Voice |
|---|---|
| SEARCH FOR | Command + Key Word |
| SEND E-MAIL | Command + Free Sentence |
| : | : |

511 — Voice Operation Command; 512 — Utterance Rule of Input Voice; 510

FIG.19

| Voice Operation Command | Voice Data |
|---|---|
| SEARCH FOR | Voice Data(1) |
| SEARCH FOR | Voice Data(2) |
| : | : |

611 — Voice Operation Command; 612 — Voice Data; 610

FIG.20

| Voice Operation Command | Correction Candidate |
|---|---|
| SEARCH FOR | SYSTEM |
| SEARCH FOR | SISTER |
| : | : |

711 — Voice Operation Command; 712 — Correction Candidate; 710

FIG.22

| Voice Operation Command | Utterance Rule of Input Voice |
|---|---|
| SEND E-MAIL TO | Command + Proper Noun + Free Sentence |
| SEND SMS TO | Command + Proper Noun + Free Sentence |
| SEND MESSAGE TO | Command + Proper Noun + Free Sentence |
| : | : |

# VOICE RECOGNITION SYSTEM AND VOICE RECOGNITION DEVICE

FIELD OF THE INVENTION

The present invention relates to a voice recognition system that performs voice recognition on both a server side and a client side, and a technique for providing an improvement in the voice recognition accuracy in a voice recognition device on the client side of the above-mentioned voice recognition system.

BACKGROUND OF THE INVENTION

Conventionally, there is provided a voice recognition system that performs voice recognition on both a server side and a client side in order to improve the performance of voice recognition on voice data.

For example, for a voice recognition device disclosed in patent reference 1, a method of performing voice recognition on a client side first, and performing voice recognition on a server side and using a voice recognition result provided by the server side when it is determined that a recognition score showing the accuracy of a voice recognition result of the client side is bad is proposed. Further, a method of performing voice recognition on a client side and voice recognition on a server side simultaneously and in parallel, comparing the recognition score of a voice recognition result provided by the client side and the recognition score of a voice recognition result provided by the server side, and using the voice recognition result having a better recognition score is also proposed.

Further, for a voice recognition system disclosed in patent reference 2, a method of a server side transmitting part of speech information (a common noun, a particle, or the like) in addition to a voice recognition result, and a client side correcting the recognition result by using the part of speech information received thereby, e.g., replacing a common noun with a proper noun is proposed.

RELATED ART DOCUMENT

Patent Reference

Patent reference 1: Japanese Unexamined Patent Application Publication No. 2009-237439
Patent reference 2: Japanese Unexamined Patent Application Publication No. 2010-85536

SUMMARY OF THE INVENTION

Problems to be Solved by the Invention

A problem with the technique disclosed by above-mentioned patent reference 1 is, however, that because after the client side has performed voice recognition first, the server side performs voice recognition, the time which is the result of adding a delay time required for the client side to acquire a voice recognition result, and a delay time required for the server side to acquire a voice recognition result is a response time, and therefore the delay time which has elapsed until the results are acquired since the voice has been inputted increases.

A further problem is that because the recognition score provided by the client side and that provided by the server side are compared and the better one of the recognition scores is used, when the server side does not transmit any recognition score or when the method of calculating the recognition score which the server side transmits is unknown (e.g., in a case in which the client manufacturer develops only the voice recognition of the client side, and uses a voice recognition server provided by another manufacturer), the comparison with the recognition score provided by the client side cannot be made correctly, and high-accuracy selection of a voice recognition result cannot be performed.

Further, a problem with the technique disclosed by patent reference 2 is that because the client side corrects the voice recognition result by using the voice recognition result and the part of speech information which are transmitted by the server side, when the server side does not transmit any part of speech information, a voice recognition result cannot be selected with a high degree of accuracy.

The present invention is made in order to solve the above-mentioned problems, and it is therefore an object of the present invention to provide a technique of reducing the delay time which has elapsed until voice recognition results are acquired since a voice has been inputted and selecting a voice recognition result with a high degree of accuracy also when information other than the voice recognition results cannot be used, the information including recognition scores and part of speech information which the server side transmits.

Means for Solving the Problem

In accordance with the present invention, there is provided a voice recognition system including: a server device provided with a server-side receiver that receives voice data inputted from a voice recognition device, a server-side voice recognizer that performs voice recognition on the voice data received by the server-side receiver, and generates a server-side voice recognition result candidate, and a server-side transmitter that transmits the server-side voice recognition result candidate generated by the server-side voice recognizer to the voice recognition device; and the voice recognition device provided with a voice inputter that converts an uttered voice inputted thereto into the voice data, a client-side voice recognizer that performs voice recognition on the voice data converted by the voice inputter, and generates a client-side voice recognition result candidate, a client-side transmitter that transmits the voice data converted by the voice inputter to the server device, a client-side receiver that receives the server-side voice recognition result candidate transmitted by the server-side transmitter, a recognition result candidate comparator that compares a plurality of server-side voice recognition result candidates received by the client-side receiver, to detect texts having a difference, a recognition result integrator that integrates the client-side voice recognition result candidate and the server-side voice recognition result candidate on the basis of the client-side voice recognition result candidate, the server-side voice recognition result candidate, and a detection result provided by the recognition result candidate comparator, to decide a voice recognition result, and an outputter that outputs the voice recognition result decided by the recognition result integrator.

Advantages of the Invention

In accordance with the present invention, the delay time which has elapsed until voice recognition results are acquired since a voice has been inputted can be reduced and a voice recognition result can be selected with a high degree of accuracy.

BRIEF DESCRIPTION OF THE FIGURES

FIG. 7 is a diagram showing an example of the storage of utterance rule patterns of the voice recognition system in accordance with Embodiment 2;

FIG. 10 is a diagram showing an example of storage in an input voice/recognition result storage of the voice recognition system in accordance with Embodiment 3;

FIG. 12 is a diagram showing a database for correction of the voice recognition system in accordance with Embodiment 3;

FIG. 15 is a diagram showing an example of the storage of utterance rule patterns of the voice recognition system in accordance with Embodiment 4;

FIG. 18 is a diagram showing an example of the storage of utterance rule patterns of the voice recognition system in accordance with Embodiment 6;

FIG. 19 is a diagram showing an example of storage in an input voice/recognition result storage of a voice recognition system in accordance with Embodiment 7;

FIG. 20 is a diagram showing a database for correction of the voice recognition system in accordance with Embodiment 7;

FIG. 22 is a diagram showing an example of the storage of utterance rule patterns of the voice recognition system in accordance with Embodiment 8.

EMBODIMENTS OF THE INVENTION

Hereafter, in order to explain this invention in greater detail, the preferred embodiments of the present invention will be described with reference to the accompanying drawings.

Embodiment 1

Figure 1:
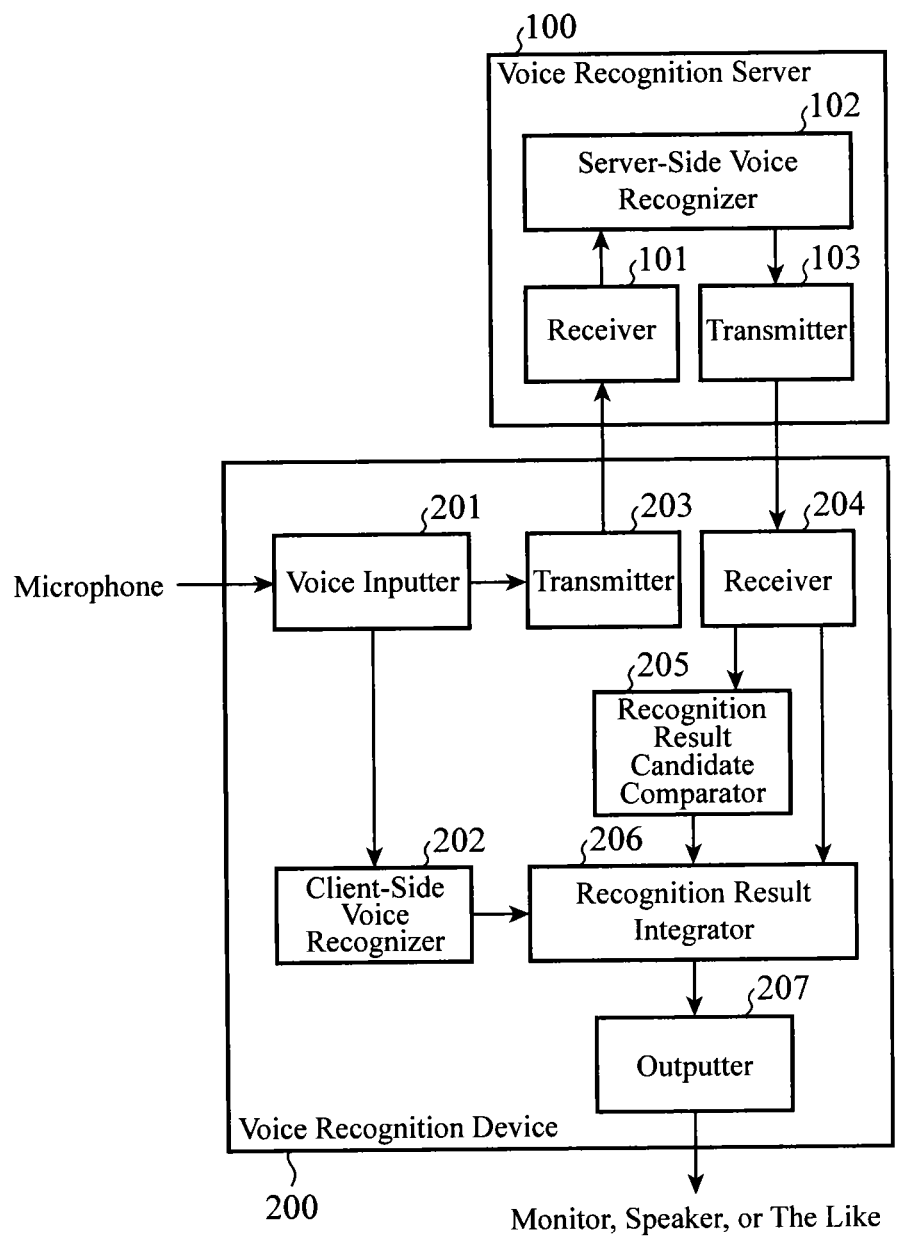
FIG. 1 is a block diagram showing the configuration of a voice recognition system in accordance with Embodiment 1.

FIG. 1 is a block diagram showing the configuration of a voice recognition system in accordance with Embodiment 1 of the present invention.

The voice recognition system is configured with a voice recognition server (server device) 100 and a voice recognition device 200.

The voice recognition server 100 includes a receiver (server-side receiver) 101, a server-side voice recognizer 102, and a transmitter (server-side transmitter) 103, and has a function of performing voice recognition on voice data received from the voice recognition device 200, and transmitting a voice recognition result to the voice recognition device 200. The receiver 101 receives voice data from the voice recognition device 200. The server-side voice recognizer 102 performs voice recognition on the voice data received by the receiver 101, and generates a server-side voice recognition result candidate. The transmitter 103 transmits the server-side voice recognition result candidate generated by the server-side voice recognizer 102 to the voice recognition device 200.

The voice recognition device 200 includes a voice inputter 201, a client-side voice recognizer 202, a transmitter (client-side transmitter) 203, a receiver (client-side receiver) 204, a recognition result candidate comparator 205, a recognition result integrator 206, and an outputter 207, and has a function of performing voice recognition on voice data inputted thereto via a microphone or the like, and outputting a voice recognition result. The voice inputter 201 converts a user's uttered voice inputted thereto via the microphone or the like into voice data which is a data signal. The client-side voice recognizer 202 performs voice recognition on the voice data converted by the voice inputter 201, and generates a client-side voice recognition result candidate. The transmitter 203 transmits the voice data inputted thereto from the voice inputter 201 to the voice recognition server 100. The receiver 204 receives the server-side voice recognition result candidate transmitted thereto from the voice recognition server 100.

The recognition result candidate comparator 205 compares pieces of text information included in a plurality of server-side voice recognition result candidates transmitted thereto, via the receiver 204, from the voice recognition server 100, to detect partial texts having a difference. The recognition result integrator 206 integrates the voice recognition result candidates on the basis of the client-side voice recognition result candidate generated by the client-side voice recognizer 202, the server-side voice recognition result candidates received by the receiver 204, and a detection result provided by the recognition result candidate comparator 205, to decide a voice recognition result. The outputter 207 outputs the voice recognition result decided by the recognition result integrator 206 to an output device, such as a monitor or a speaker.

Next, operations of the voice recognition system in accordance with Embodiment 1 will be explained with reference to FIGS. 2 and 3.

Figure 2:
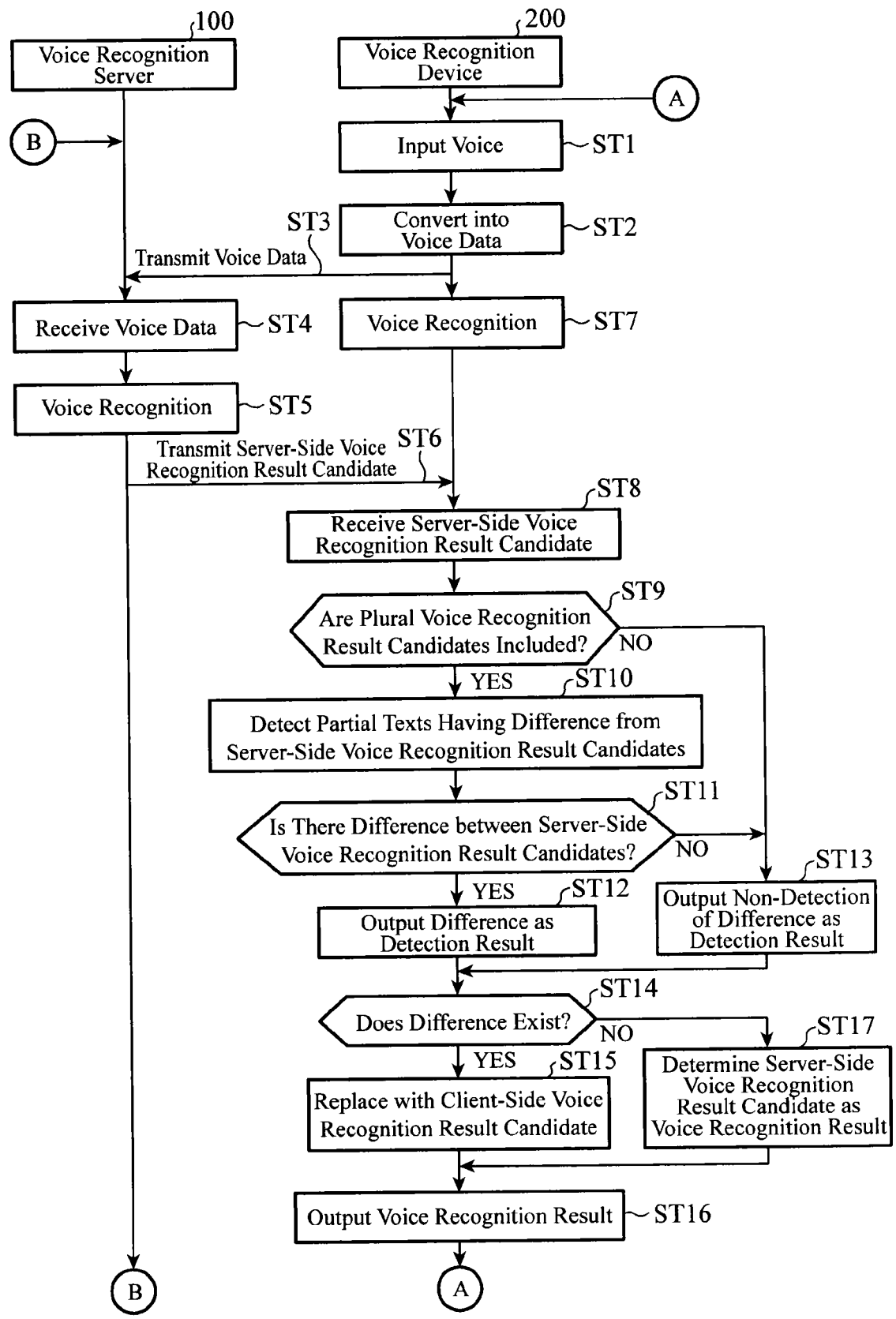
FIG. 2 is a flow chart showing operations of the voice recognition system in accordance with Embodiment 1.
Figure 3:
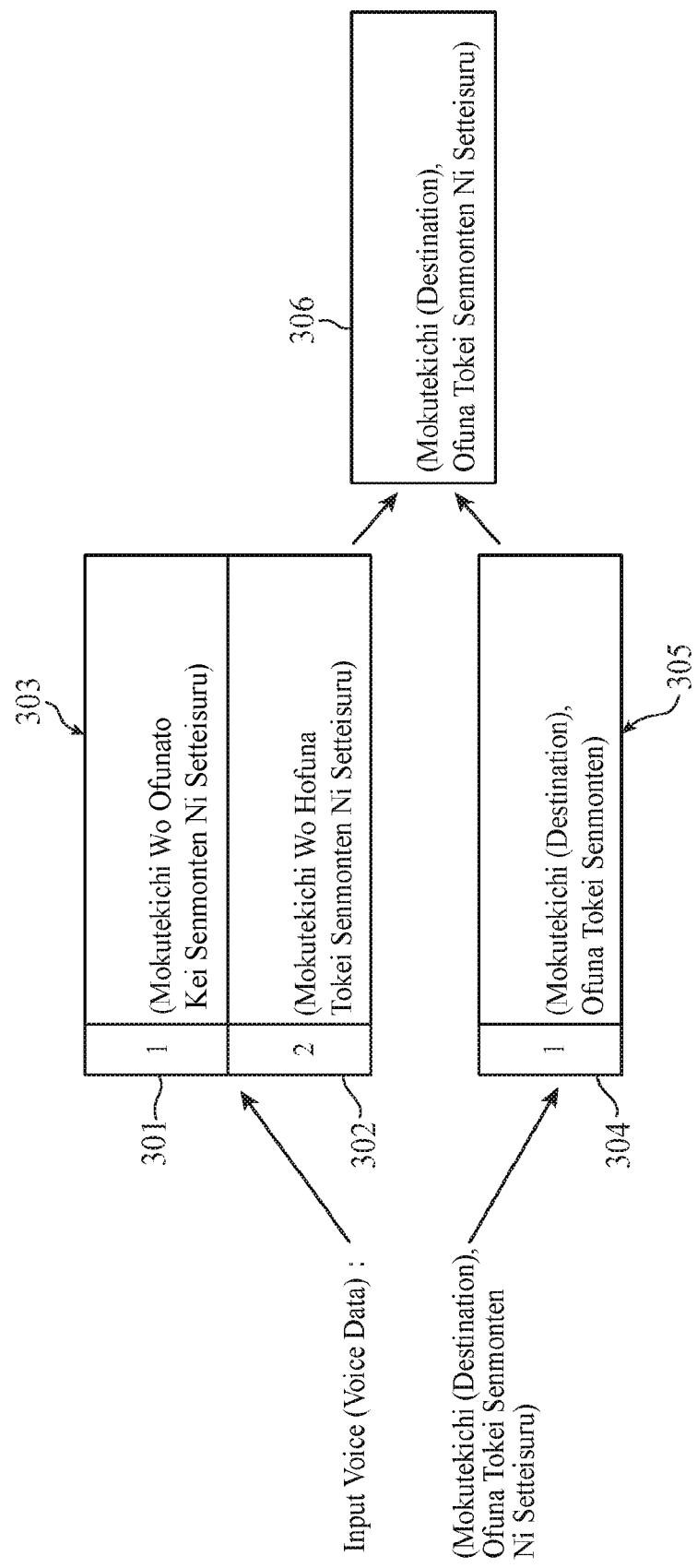
FIG. 3 is a diagram showing an example of the generation of a voice recognition result by the voice recognition system in accordance with Embodiment 1.

FIG. 2 is a flow chart showing the operations of the voice recognition system in accordance with Embodiment 1 of the present invention, and FIG. 3 is a diagram showing an example of the generation of a voice recognition result by the voice recognition system in accordance with Embodiment 1 of the present invention.

When a voice uttered by a user is inputted (step ST1), the voice inputter 201 of the voice recognition device 200 converts the inputted voice into voice data, and outputs the voice data converted thereby to the client-side voice recognizer 202 and the transmitter 203 (step ST2). The transmitter 203 transmits the voice data inputted thereto in step ST2 to the voice recognition server 100 (step ST3).

In the voice recognition server 100, the receiver 101 receives the voice data transmitted in step ST3, and outputs the voice data received thereby to the server-side voice recognizer 102 (step ST4). The server-side voice recognizer 102 performs voice recognition on the voice data inputted thereto in step ST4, and generates a server-side voice recognition result candidate (step ST5). The transmitter 103 transmits text information of the server-side voice recognition result candidate generated in step ST5 to the voice recognition device 200 (step ST6).

For example, the server-side voice recognizer 102 sets an arbitrary document as an object to be recognized and performs voice recognition on the voice data "目的地、大船時計専門 店に設定する (mokutekichi (destination), Ofuna tokei senmonten ni setteisuru)" received from the voice recognition device 200, and acquires a server-side voice recognition result candidate list 303 which is shown in FIG. 3 and which includes "目的地を大船渡 軽専門店に 設定する (mokutekichi wo ofunato kei senmonten ni setteisuru)" which is a server-side voice recognition result candidate 301 and " 目的地を豊富 な時計専門 店に設定する (mokutekichi wo hofuna tokei senmonten ni setteisuru)" which is a server-side voice recognition result candidate 302. The transmitter 103 transmits the server-side voice recognition result candidate list 303 to the voice recognition device 200.

On the other hand, in the voice recognition device 200, the client-side voice recognizer 202 performs voice recognition on the voice data inputted thereto in step ST2 and generates a client-side voice recognition result candidate, and outputs text information of the acquired client-side voice recognition result candidate to the recognition result integrator 206 (step ST7).

For example, in a case in which the client-side voice recognizer 202 sets only a command for voice operation and data about the name of a place in the vicinity of the current position as an object to be recognized, when a user makes a voice input of "目的地、大船時計専 門店に設定する (mokutekichi (destination), Ofuna tokei senmonten ni setteisuru)", the client-side voice recognizer 202 recognizes "目的地 (mokutekichi (destination))" which is a voice operation command, and " 大船時計専門店 (Ofuna tokei senmonten (Ofuna watch specialty store))" which is data about the name of a place in the vicinity of the current position, and acquires a client-side voice recognition result candidate list 305 which is shown in FIG. 3 and includes "目的地、大船時計専門店 (mokutekichi (destination), Ofuna tokei senmonten ni setteisuru)" which is a client-side voice recognition result candidate 304. In the example of FIG. 3, the client-side voice recognition result candidate list 305 consists of only the single client-side voice recognition result candidate 304.

Further, when receiving the server-side voice recognition result candidate transmitted, in step ST6, from the voice recognition server 100, the receiver 204 of the voice recognition device 200 outputs the server-side voice recognition result candidate received thereby to the recognition result candidate comparator 205 and the recognition result integrator 206 (step ST8). The recognition result candidate comparator 205 determines whether the server-side voice recognition result candidate inputted thereto in step ST8 includes a plurality of voice recognition result candidates (step ST9).

When a plurality of voice recognition result candidates are included (when YES in step ST9), the recognition result candidate comparator 205 compares the texts of the voice recognition result candidates to detect partial texts having a difference (step ST10). The recognition result candidate comparator 205 determines whether it has detected partial texts having a difference (step ST11), and, when having detected partial texts having a difference (when YES in step ST11), outputs the partial texts having a difference to the recognition result integrator 206 as a detection result (step ST12).

For example, in the example of FIG. 3, the two server-side voice recognition result candidates 301 and 302 are included in the server-side voice recognition result candidate list 303, and the recognition result candidate comparator compares " 目的地 を大船渡軽専門 店に設定する (mokutekichi wo ofunato kei senmonten ni setteisuru)" and "目的地を豊富な 時計専門店 に設定する (mokutekichi wo hofuna tokei senmonten ni setteisuru)", which are the pieces of text information of the candidates, and detects portions each enclosed between the leading text "目的地を (mokutekichi wo)" and the trailing text "専門店に設定する (senmonten ni setteisuru)" as partial texts having a difference. Concretely, the recognition result candidate comparator detects "大船渡軽 (ofunato kei)" in the server-side voice recognition result candidate 301, and " 豊富な時計 (hofuna tokei)" in the server-side voice recognition result candidate 302 as partial texts having a difference.

In contrast, when a plurality of voice recognition result candidates are not included (when NO in step ST9), and when partial texts having a difference are not detected (when NO in step ST11), the recognition result candidate comparator outputs non-detection of a difference to the recognition result integrator 206 as a detection result (step ST13).

For example, in the example of FIG. 3, when only the server-side voice recognition result candidate 301 is included in the server-side voice recognition result candidate list 303, the recognition result candidate comparator does not detect partial texts having a difference.

The recognition result integrator 206 refers to the detection result inputted thereto in step ST12 or ST13, and determines whether partial texts having a difference exist (step ST14). When partial texts having a difference exist (when YES in step ST14), the recognition result integrator 206 replaces the text information of a partial text having a difference with text information of the client-side voice recognition result candidate generated in step ST7, to determine a voice recognition result (step ST15). After that, the recognition result integrator outputs this voice recognition result to the outputter 207 (step ST16).

For example, in the example of FIG. 3, when the partial text " 大船渡軽 (ofunato kei)" in the server-side voice recognition result candidate 301 and the partial text " 豊富な時計 (hofuna tokei)", each of which is enclosed between the leading text "目的地を (mokutekichi wo)" and the trailing text "専門店に設定 する (senmonten ni setteisuru)", are detected as partial texts having a difference, a search of whether a partial text matching "目的地を (mokutekichi wo)" and a partial text matching " 専門店に設 定する (senmonten ni setteisuru)" exist in the client-side voice recognition result candidate 304 is performed. Neither of the partial texts is included in the example of FIG. 3. In this case, the partial texts to be searched for are partially shortened to ones like "目的地 (mokutekichi)" and "専門店 (senmonten)", respectively, and a re-search is performed by using the shortened partial texts. In the example of FIG. 3, as a result of the re-search, ", 大船時計 (, Ofuna tokei)" which is enclosed between "目的地 (mokutekichi)" and "専門店 (senmonten)" is retrieved. After that, "を大船渡軽 (wo ofunato kei)" is enclosed between "目的地 (mokutekichi)" and "専門店 (senmonten)" in the server-side voice recognition result candidate 301 is replaced by ", 大船時計 (, Ofuna tokei)" which is retrieved, and a voice recognition result 306 "目的地、大船時計専 門店に設定する (mokutekichi (destination), Ofuna tokei senmonten ni setteisuru)" is acquired.

In contrast, when determining that no partial texts having a difference exist (when NO in step ST14), the recognition result integrator 206 determines the server-side voice recognition result candidate which the receiver 204 receives in step ST8 as a voice recognition result (step ST17), and outputs this voice recognition result to the outputter 207 (step ST16). In the voice recognition system in accordance with the present invention, the above-mentioned processing is repeatedly performed at all times.

As mentioned above, because the voice recognition system in accordance with this Embodiment 1 is configured in such a way as to, when acquiring a plurality of server-side voice recognition result candidates from the voice recognition server 100, compare the texts of these server-side voice recognition result candidates to detect partial texts having a difference, and replaces a detected partial text having a difference with a partial text of the client-side voice recognition result candidate generated by the voice recognition device 200, to determine a final voice recognition result, even if the voice recognition system uses a voice recognition server in which a method of calculating a numerical value (recognition score) showing the accuracy of a voice recognition result is unknown, the voice recognition system can integrate a voice recognition result candidate provided by the server side and the voice recognition result candidate provided by the client side without using recognition scores, and output a more precise voice recognition result.

Further, because the voice recognition system in accordance with this Embodiment 1 is configured in such a way as to include the recognition result candidate comparator 205 that compares the texts of the server-side voice recognition result candidates to detect partial texts having a difference without performing a complicated syntactic analyzing process and re-calculation of recognition scores, and the recognition result integrator 206 that replaces a partial text having a difference, the functions of the voice recognition device can be implemented while the processing load on a CPU is suppressed.

In addition, because the voice recognition system in accordance with this Embodiment 1 is configured in such a way that the voice recognition device 200 transmits the voice data to the voice recognition server 100 at the same time when the voice recognition device inputs the voice data to the client-side voice recognizer 202, as compared with a method of transmitting the voice data to the voice recognition server 100 after the voice recognition device 200 acquires a client-side voice recognition result candidate, a voice recognition result can be acquired at an earlier time from the voice recognition server 100, and the delay time which has elapsed until the voice recognition device decides and outputs a voice recognition result can be shortened.

Although in above-mentioned Embodiment 1 the voice recognition system is configured in such a way as to, when a plurality of server-side voice recognition result candidates are acquired from the voice recognition server 100, compare the texts of the server-side voice recognition result candidates to detect partial texts having a difference and replace a partial text by using the presence or absence of the difference as a criterion of determination, the voice recognition system can alternatively use the number of server-side voice recognition result candidates having a difference and the type of this difference as a criterion of determination.

For example, when three candidates exist as the server-side voice recognition result candidates, and all three partial texts having a difference differ from one another, the reliability is determined to be $1/3$, whereas when the partial text having a difference included in only one candidate differs from the other partial texts, the reliability is determined to be $2/3$. The voice recognition system is configured in such a way as to replace only a partial text whose determined reliability is equal to or less than $1/3$ with a text of the client-side voice recognition result candidate provided by the client-side voice recognizer 202.

As a result, the accuracy of voice recognition can be improved and a more precise voice recognition result can be acquired.

Further, although the configuration in which when a plurality of server-side voice recognition result candidates are acquired, the voice recognition system compares the texts of the server-side voice recognition result candidates to detect only partial texts having a difference and existing at a single position is shown in above-mentioned Embodiment 1, a configuration can be provided in which when partial texts having a difference exist at two or more positions, it is determined that the reliability of the entire server-side voice recognition result candidates is low, and the user is requested to input a voice again.

As a result, the voice recognition system can prevent a wrong voice recognition result from being outputted.

In addition, although the configuration in which when a plurality of server-side voice recognition result candidates are acquired from the voice recognition server 100, the voice recognition system replaces a portion having a difference in the text of a server-side voice recognition result candidate with a text of the client-side voice recognition result candidate is shown in above-mentioned Embodiment 1, a configuration can be provided in which the client-side voice recognizer 202 calculates a recognition score, and replacement of the text is performed only when the calculated recognition score is equal to or greater than a predetermined threshold.

As a result, the accuracy of voice recognition can be improved and a more precise voice recognition result can be acquired.

Embodiment 2

Although the configuration in which the voice recognition system compares the texts of server-side voice recognition result candidates and replaces a partial text having a difference with a client-side voice recognition result candidate is shown in above-mentioned Embodiment, in this Embodiment 2, a configuration will be shown in which the text of a server-side voice recognition result candidate is divided by using a partial text having a difference as a reference, and combining a text after division and data based on a client-side voice recognition result candidate.

Figure 4:
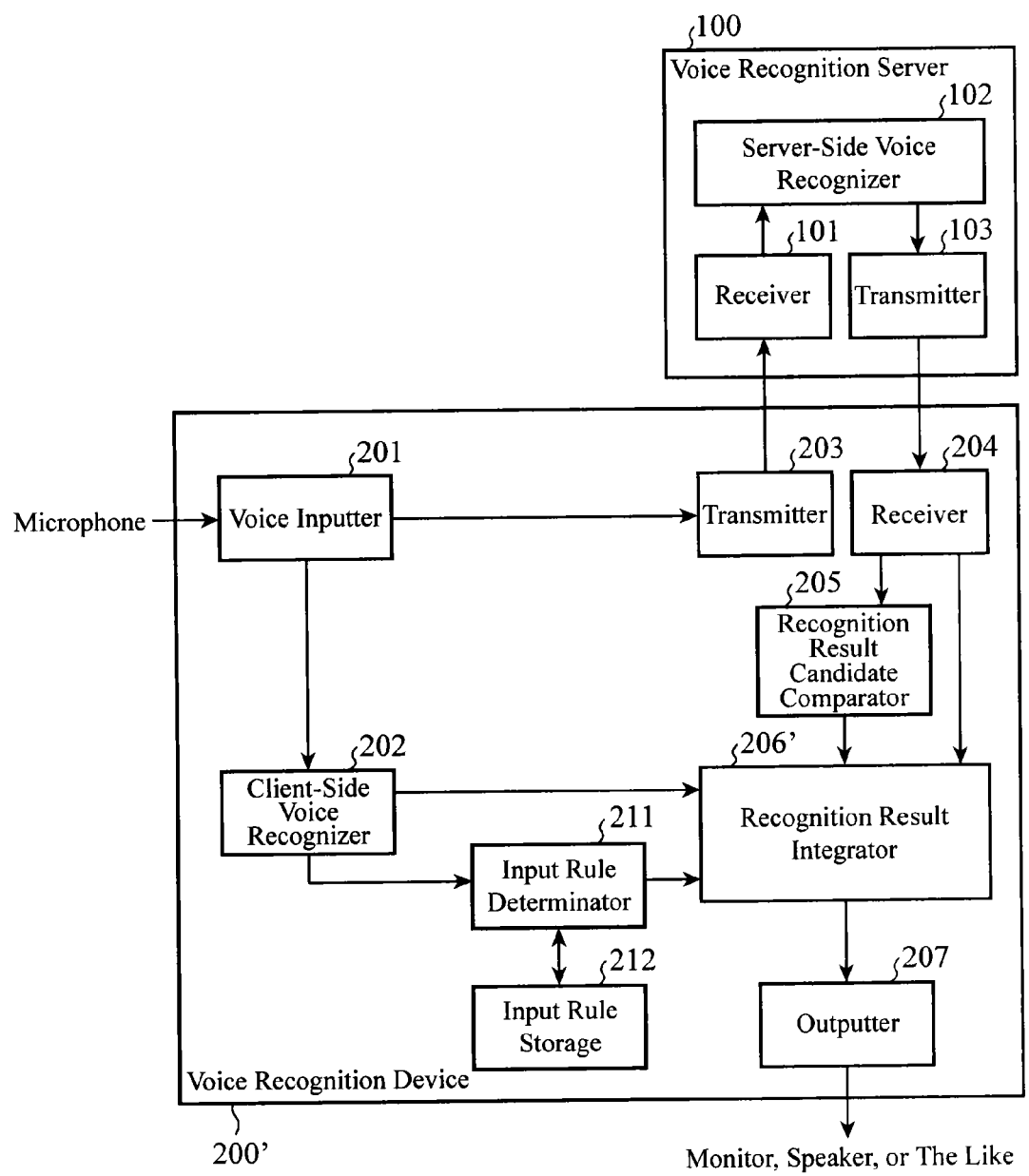
FIG. 4 is a block diagram showing the configuration of a voice recognition system in accordance with Embodiment 2.

FIG. 4 is a block diagram showing the configuration of a voice recognition system in accordance with Embodiment 2 of the present invention. The voice recognition system in accordance with this Embodiment 2 is also configured with a voice recognition server 100 and a voice recognition device 200'. The voice recognition device 200' in accordance with Embodiment 2 includes an input rule determinator 211 and an input rule storage 212 in addition to the components of the voice recognition device 200 shown in FIG. 1. Hereafter, the same components as those of the voice recognition system in accordance with Embodiment 1 or like components are designated by the same reference numerals as those used in FIG. 1, and the explanation of the components will be omitted or simplified.

The input rule determinator 211 extracts a key word from a client-side voice recognition result candidate generated by a client-side voice recognizer 202, and determines an utterance rule of the input voice. The input rule storage 212 is a database that stores utterance rule patterns of the input voice. A recognition result integrator 206' integrates voice recognition result candidates on the basis of the client-side voice recognition result candidate generated by the client-side voice recognizer 202, a server-side voice recognition result candidate received by a receiver 204, a detection result provided by a recognition result candidate comparator 205, and the utterance rule determined by the input rule determinator 211, to decide a voice recognition result.

Next, operations of the voice recognition system in accordance with Embodiment 1 will be explained with reference to FIGS. 5 to 7.

Figure 5:
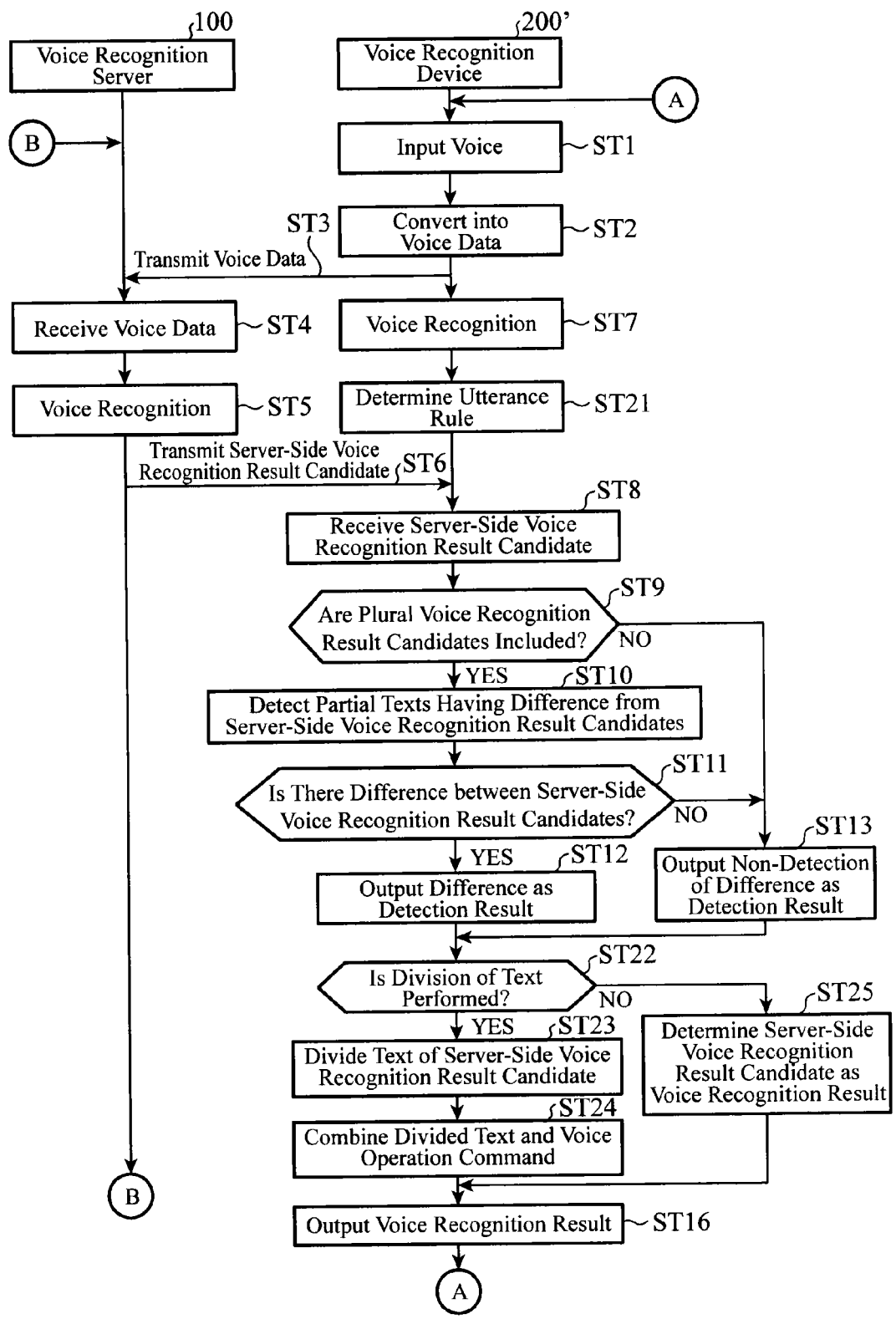
FIG. 5 is a flow chart showing operations of the voice recognition system in accordance with Embodiment 2.
Figure 6:
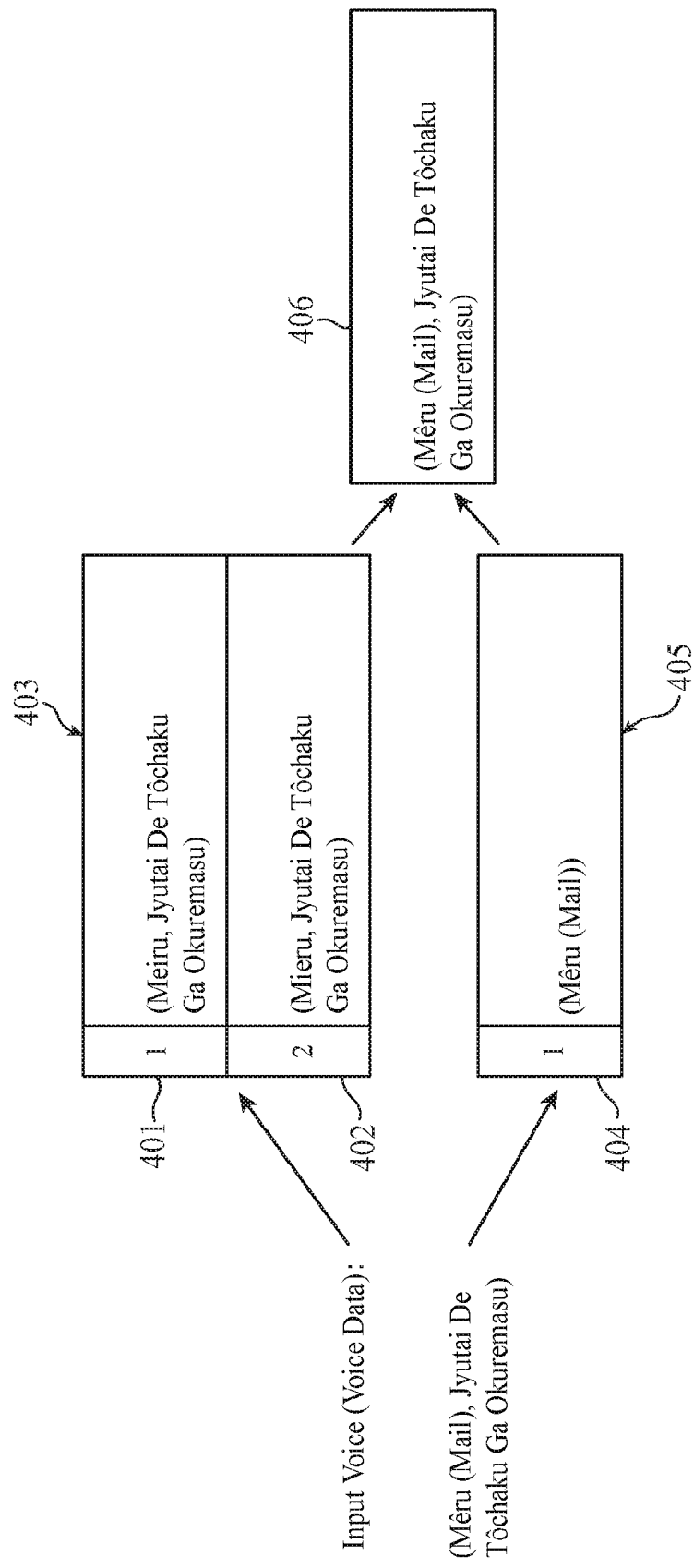
FIG. 6 is a diagram showing an example of the generation of a voice recognition result by the voice recognition system in accordance with Embodiment 2.

FIG. 5 is a flow chart showing the operations of the voice recognition system in accordance with Embodiment 2 of the present invention, FIG. 6 is a diagram showing an example of the generation of a voice recognition result by the voice recognition system in accordance with Embodiment 2, and FIG. 7 is a diagram showing an example of the storage of the utterance rule patterns of the voice recognition system in accordance with Embodiment 2. In the flow chart of FIG. 5, the same steps as those of the voice recognition system in accordance with Embodiment 1 are designated by the same reference characters as those used in FIG. 2, and the explanation of the steps will be omitted or simplified.

First, the voice recognition device 200' performs processes of steps ST1, ST2, and ST7, and performs voice recognition on inputted voice data, like that in accordance with Embodiment 1.

For example, when the client-side voice recognizer 202 sets only a voice operation command as an object to be recognized, the client-side voice recognizer performs voice recognition on the voice data "メール、渋滞で到着が遅れます。 (Meru (Mail) jyutai de tôchaku ga okuremasu.)" which is inputted by a user, and acquires a single client-side voice recognition result candidate 404 "メール Mêru (Mail)", in the example shown in FIG. 6. In the example of FIG. 6, a client side voice recognition result list 405 consists of the single client-side voice recognition result candidate 404. The acquired client-side voice recognition result candidate is outputted to the recognition result integrator 206' and the input rule determinator 211.

Next, the input rule determinator 211 refers to both the client-side voice recognition result candidate inputted thereto from the client-side voice recognizer 202, and the utterance rule patterns stored in the input rule storage 212, to verify a voice operation command, and determines the utterance rule of the voice data inputted in step ST1 (step ST21).

As shown in FIG. 7, each utterance rule pattern 500 stored in the input rule storage 212 consists of a voice operation command 501 and an utterance rule 502 of the input voice. It is shown in the figure that, for example, when the voice operation command 501 is "メール (mêru (mail))", "command (メール (mêru (mail)))+free sentence" is acquired as the utterance rule 502 of the input voice.

When the client-side voice recognition result candidate 404 is "メール (mêru (mail))", as shown in FIG. 6, the input rule determinator 211 acquires "command+free sentence" which is the utterance rule 502 of the input voice corresponding to "メール (mêru (mail))" which is the matching voice operation command 501, and the acquired utterance rule of the input voice is outputted to the recognition result integrator 206'.

On the other hand, the voice recognition server 100 performs the same processes as those of steps ST4 to ST6 and transmits a server-side voice recognition result candidate acquired thereby to the voice recognition device 200'.

For example, when a server-side voice recognizer 102 sets an arbitrary document as an object to be recognized, the server-side voice recognizer performs voice recognition on the received voice data "メール、渋滞で到着が遅れます。 (Mêru (Mail), jyutai de tôchaku ga okuremasu.)", and acquires a server-side voice recognition result candidate 401 "滅入る、渋滞で到着が遅れます (Meiru, jyutai de tôchaku ga okuremasu)", and a server-side voice recognition result candidate 402 "見える、渋滞で到着が遅れます (Mieru, jyutai de tôchaku ga okuremasu)." As a server-side voice recognition result candidate list 403, the two acquired server-side voice recognition result candidates 401 and 402 are outputted to the voice recognition device 200'.

Next, the voice recognition device 200' performs processes of steps ST8 to ST13. In the detection, in step ST10, of partial texts having a difference, as will be explained by taking, as an example, the case of FIG. 6, the voice recognition device compares the server-side voice recognition result candidate 401 "滅入る、渋滞で到着が遅れます (Meiru, jyutai de tôchaku ga okuremasu)" and the server-side voice recognition result candidate 402 "見える、渋滞で到着が遅れます (Mieru, jyutai de tôchaku ga okuremasu)" in the server-side voice recognition result candidate list 403, and detects "滅入る (Meiru)" and "見える (Mieru)" as partial texts having a difference. The detection result is outputted to the recognition result integrator 206'.

The recognition result integrator 206' determines whether or not it is necessary to perform text division on a server-side voice recognition result candidate on the basis of the client-side voice recognition result candidate generated, in step ST7, by the client-side voice recognizer 202, the utterance rule determined, in step ST21, by the input rule determinator 211, the server-side voice recognition result candidates received, in step ST8, by the receiver 204, and the result of the detection of a difference which is inputted, in step ST12 or ST13, from the recognition result candidate comparator 205 (step ST22).

In the examples of FIGS. 6 and 7, when the client-side voice recognition result candidate 404 "メール (mêru (mail))" provided by the client-side voice recognizer 202 is inputted, and the server-side voice recognition result candidate list 403 which consists of the server-side voice recognition result candidates 401 and 402 is inputted from the receiver 204, because "メール (mêru (mail))" is not included in the texts of the server-side voice recognition result candidates 401 and 402, the utterance rule inputted from the input rule determinator 211 is "command+free sentence", and the detection result showing that a difference is detected is inputted from the recognition result candidate comparator 205, it is determined that it is necessary to divide the text.

When it is necessary to perform text division on a server-side voice recognition result candidate (when YES in step ST22), the recognition result integrator 206' performs text division on the text of a server-side voice recognition result candidate received by the receiver 204 by using a partial text having a difference as a reference (step ST23).

Because as to the text of the server-side voice recognition result candidate 401, "滅入る (meiru)" is detected as a partial text having a difference in the example shown in FIG. 6, the text is divided into two texts: "滅入る (meiru)" and "渋滞で到着 が遅れます (jyutai de tôchaku ga okuremasu)."

Next, the recognition result integrator 206' combines a text after division of step ST23 and the voice operation command corresponding to the client-side voice recognition result candidate on the basis of the utterance rule inputted from the input rule determinator 211, and outputs a combined result, as a voice recognition result, to an outputter 207 (step ST24).

In the example shown in FIG. 6, "メール、渋滞で 到着が遅れます (Mêru (Mail)), jyutai de tôchaku ga okuremasu)" which is acquired by combining the voice operation command "メール (mêru (mail))" and a text after division "渋滞で到着 が遅れます (jyutai de tôchaku ga okuremasu)" which corresponds to a free sentence on the basis of the utterance rule "command+free sentence" is provided as a voice recognition result.

In contrast, when it is not necessary to perform text division on a server-side voice recognition result candidate (when NO in step ST22), the recognition result integrator 206' determines the server-side voice recognition result candidate received in step ST8 as a voice recognition result (step ST25), and outputs this voice recognition result to the outputter 207 (step ST16).

When the text of the client-side voice recognition result candidate inputted from the client-side voice recognizer 202 is included in a server-side voice recognition result candidate received by the receiver 204, the recognition result integrator 206' determines that it is not necessary to divide the text.

Further, when the utterance rule inputted from the input rule determinator 211 has only a "command", the recognition result integrator determines that it is not necessary to divide the text.

In addition, when the detection result inputted from the recognition result candidate comparator 205 shows that no difference is detected, the recognition result integrator determines that it is not necessary to divide the text.

As mentioned above, the voice recognition system in accordance with this Embodiment 2 is configured in such a way as to, when a plurality of server-side voice recognition result candidates are acquired from the voice recognition server 100, compare the texts of the server-side voice recognition result candidates to detect partial texts having a difference, divide the text by using a partial text having a difference as a reference, and combine a text after division and the text of the client-side voice recognition result candidate on the basis of an utterance rule, even if the voice recognition system uses a voice recognition server in which a method of calculating a numerical value (recognition score) showing the accuracy of a voice recognition result is unknown, the voice recognition system can integrate a voice recognition result candidate provided by the server side and the voice recognition result candidate provided by the client side without using recognition scores, and output a more precise voice recognition result.

Further, because the voice recognition system in accordance with this Embodiment 2 is configured in such a way as to divide the text by using a partial text having a difference as a reference and combine a text after division and the text of the client-side voice recognition result candidate, even if the voice recognition server cannot recognize a voice operation command with a high degree of accuracy, the voice recognition system can use only a partial text of a document without using the text of a portion corresponding to a voice operation command, and output a more precise voice recognition result.

In addition, because the voice recognition system in accordance with this Embodiment 2 is configured in such a way as to include the recognition result candidate comparator 205 that compares the texts of the server-side voice recognition result candidates to detect partial texts having a difference without performing a complicated syntactic analyzing process and re-calculation of recognition scores, and the recognition result integrator 206' that divides the text by using a partial text having a difference as a reference and combines the text of the client-side voice recognition result candidate, the functions of the voice recognition device can be implemented while the processing load on a CPU is suppressed.

Further, because the voice recognition system in accordance with this Embodiment 2 is configured in such a way as to suppress the amount of computations without performing a complicated syntactic analysis by comparing the texts of recognition results to detect a portion having low reliability, the functions of the voice recognition device 200' can be implemented by using a CPU having low arithmetic performance.

In addition, because the voice recognition system in accordance with this Embodiment 2 is configured in such a way that the voice recognition device 200' transmits the voice data to the voice recognition server 100 at the same time when the voice recognition device inputs the voice data to the client-side voice recognizer 202, as compared with a method of transmitting the voice data to the voice recognition server 100 after the voice recognition device 200' acquires a client-side voice recognition result candidate, a voice recognition result can be acquired at an earlier time from the voice recognition server 100, and the delay time which has elapsed until the voice recognition device decides and outputs a voice recognition result can be shortened.

Although the example in which "only command", "command+free sentence", and "command+place name" are listed as the utterance rule patterns is shown in above-mentioned Embodiment 2, the positions of voice operation commands can be limited, as utterance rules, only to the head or the tail of an utterance.

In this case, when a difference occurs at portions other than the heads or the tails of server-side voice recognition result candidates, it can be determined that a recognition error occurs in a portion other than a voice operation command, and it becomes possible to also make a request of the user to input a voice again. As a result, the voice recognition system can prevent a wrong voice recognition result from being outputted.

Although the configuration in which the input rule storage 212 is disposed in the voice recognition device 200' is shown in above-mentioned Embodiment 2, the voice recognition device can be configured in such a way as to acquire an utterance rule pattern stored externally.

Embodiment 3

Although the configuration in which the voice recognition system compares the texts of server-side voice recognition result candidates and divides the text of a server-side voice recognition result candidate by using a partial text having a difference as a reference is shown in above-mentioned Embodiment 2, in this Embodiment 3, a configuration will be shown in which a voice recognition system detects a change of a server-side voice recognition result candidate, and divides the text at all times.

Figure 8:
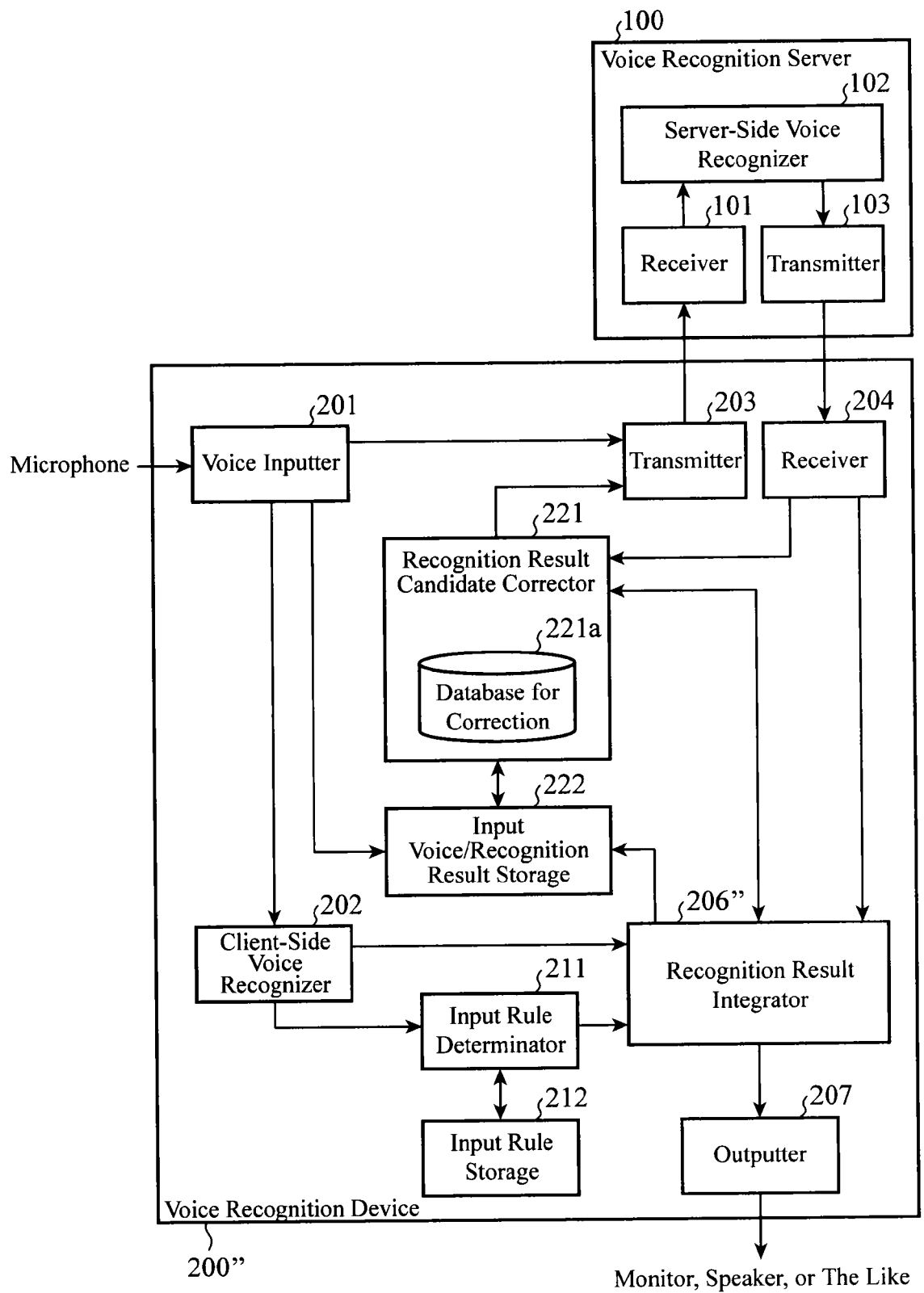
FIG. 8 is a block diagram showing the configuration of a voice recognition system in accordance with Embodiment 3.

FIG. 8 is a block diagram showing the configuration of the voice recognition system in accordance with Embodiment 3 of the present invention.

The voice recognition system in accordance with this Embodiment 3 is also configured with a voice recognition server 100 and a voice recognition device 200". The voice recognition device 200" in accordance with Embodiment 3 includes a recognition result candidate corrector 221 and an input voice/recognition result storage 222 in addition to the components of the voice recognition device 200' shown in FIG. 2, while the recognition result candidate comparator 205 is eliminated. Hereafter, the same components as those of the voice recognition systems in accordance with Embodiments 1and 2 or like components are designated by the same reference numerals as those used in FIG. 1 or 4, and the explanation of the components will be omitted or simplified.

The recognition result candidate corrector 221 automatically transmits voice data to the voice recognition server 100 when the voice recognition device 200' is started, and generates a database 221a for correction of voice operation commands on the basis of a voice recognition result received from the voice recognition server 100. The input voice/recognition result storage 222 is a buffer that stores voice data converted by a voice inputter 201 and a voice recognition result generated by a recognition result integrator 206" while bringing them into correspondence with each other. The recognition result integrator 206" integrates a server-side voice recognition result candidate and a client-side voice recognition result candidate by using the database 221a for correction which is generated by the recognition result candidate corrector 221.

Next, operations of the voice recognition system in accordance with Embodiment 3 will be explained. Hereafter, the operations will be explained by dividing the operations into an operation, as a first operation, at the time when a voice input is made in a state in which no data is stored in the input voice/recognition result storage 222, an operation, as a second operation, of generating the database 221a for correction when the voice recognition device 200' is started, and an operation, as a third operation, at the time when a voice input is made in a state in which data is stored in the input voice/recognition result storage 222 and the database 221a for correction has been generated.

Hereafter, the same steps as those of the voice recognition system in accordance with Embodiment 1 or 2 are designated by the same reference characters as those used in FIG. 2 or 5, and the explanation of the steps will be omitted or simplified.

<First Operation>

Figure 9:
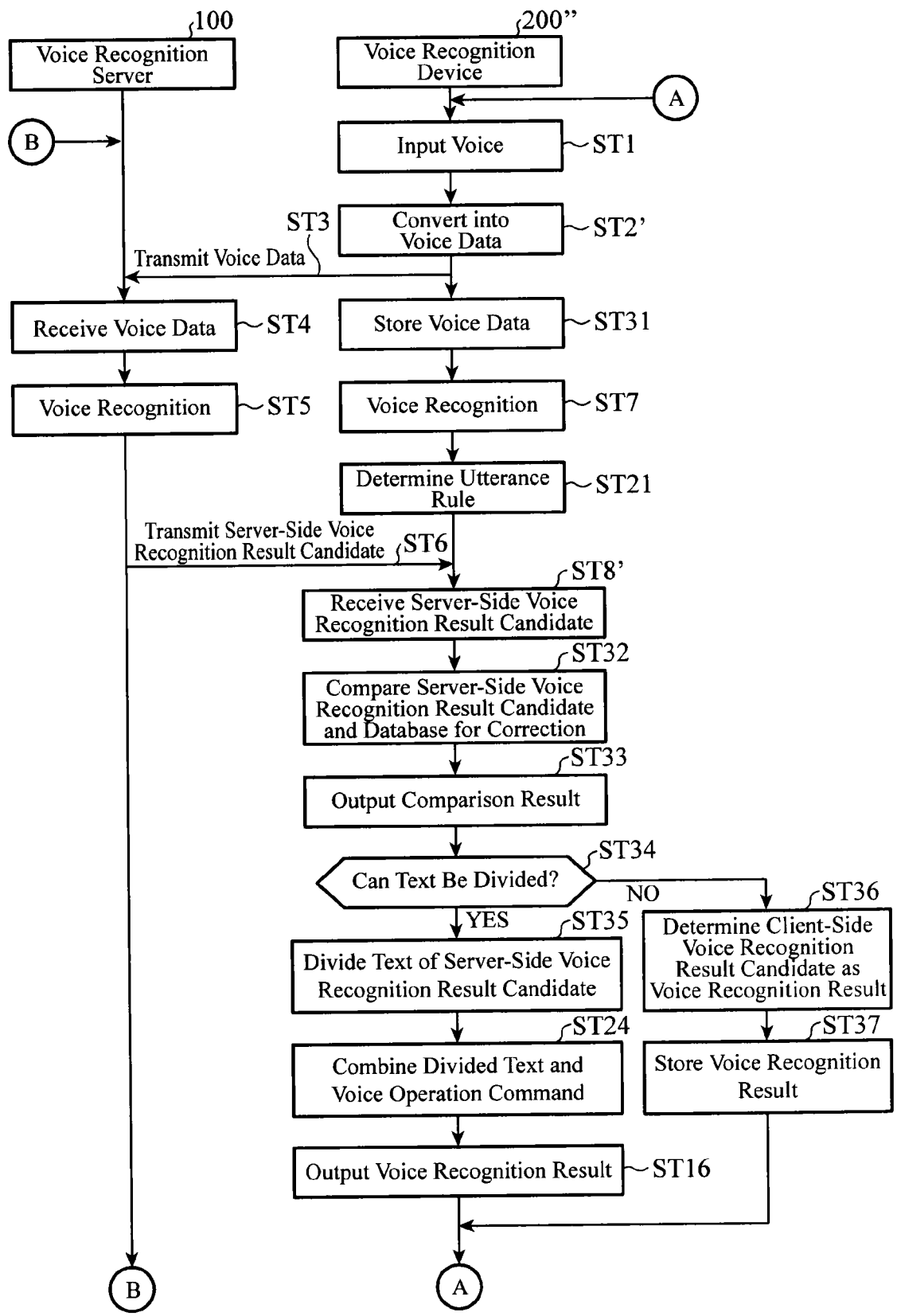
FIG. 9 is a flow chart showing first and third operations of the voice recognition system in accordance with Embodiment 3.

First, the first operation will be explained with reference to FIGS. 9 and 10, and FIG. 6 shown in Embodiment 2.

FIG. 9 is a flow chart showing the first and third operations of the voice recognition system in accordance with Embodiment 3 of the present invention, and FIG. 10 is a diagram showing an example of the storage in the input voice/recognition result storage.

When a user's uttered voice is inputted (step ST1), the voice inputter 201 of the voice recognition device 200" converts the uttered voice inputted thereto into voice data, and outputs the voice data converted thereby to a client-side voice recognizer 202, a transmitter 203, and the input voice/recognition result storage 222 (step ST2'). The input voice/recognition result storage 222 stores, as "voice data (1)", the voice data inputted in step ST2' in a form shown in, for example, FIG. 10 (step ST31).

In the example of FIG. 10, each input voice information 600 is configured by bringing a voice operation command 601 and voice data 60 into correspondence with each other.

Next, the voice recognition server 100 and voice recognition device 200" perform the same processes as those of steps ST3 to ST7, and ST21, like those in accordance with Embodiment 2. A receiver 204 of the voice recognition device 200 receives a server-side voice recognition result candidate transmitted, in step ST6, from the voice recognition server 100, and outputs the server-side voice recognition result candidate received thereby to the recognition result candidate corrector 221 and the recognition result integrator 206" (step ST8').

The recognition result candidate corrector 221 then compares the text of the server-side voice recognition result candidate inputted in step ST8' with the database 221a for correction (step ST32). In this first operation, because no data is stored in the input voice/recognition result storage 222, the database 221a for correction has not been generated. Therefore, the recognition result candidate corrector 221 outputs a comparison result showing that there is no correction candidate to the recognition result integrator 206" (step ST33).

The recognition result integrator 206" determines whether or not it is possible to perform text division on a server-side voice recognition result candidate on the basis of the client-side voice recognition result candidate generated, in step ST7, by the client-side voice recognizer 202, an utterance rule determined, in step ST21, by an input rule determinator 211, the server-side voice recognition result candidate received, in step ST8', by the receiver 204, and the comparison result acquired, in step ST33, by the recognition result candidate corrector 221 (step ST34).

For example, the client-side voice recognition result candidate 404 "メール (mêru (mail))" shown in FIG. 6 is inputted as the client-side voice recognition result candidate provided by the client-side voice recognizer 202, and the server side voice recognition result list 403 shown in FIG. 6 is inputted from the receiver 204, "メール (mêru (mail))" is not included in the texts of the server-side voice recognition result candidates 401 and 402 included in the above-mentioned server side voice recognition result list 403. Further, the utterance rule inputted from the input rule determinator 211 is "command+free sentence", and the comparison result showing that there is no correction candidate is inputted from the recognition result candidate corrector 221. As a result, the recognition result integrator 206" determines that it is impossible to divide the texts.

In contrast, when the text of the client-side voice recognition result candidate inputted from the client-side voice recognizer 202 is included in a server-side voice recognition result candidate inputted from the receiver 204, it is determined that it is possible to divide the text.

When it is possible to divide the text (when YES in step ST34), the recognition result integrator 206" performs text division on the text of a server-side voice recognition result candidate received by the receiver 204 by using the text of the client-side voice recognition result candidate inputted from the client-side voice recognizer 202 as a reference (step ST35). Next, the recognition result integrator 206" combines a text after division of step ST35 and the voice operation command corresponding to the client-side voice recognition result candidate on the basis of the utterance rule inputted from the input rule determinator 211, to generate a voice recognition result (step ST24), and outputs this voice recognition result to an outputter 207 (step ST16).

In contrast, when it is not possible to perform text division on a server-side voice recognition result candidate (when NO in step ST34), the recognition result integrator 206" determines the client-side voice recognition result candidate acquired in step ST7 as a voice recognition result (step ST36), and stores this voice recognition result in the input voice/recognition result storage 222 (step ST37). In the example shown in FIG. 10, the recognition result integrator stores the voice recognition result "メール (mêru (mail))" inputted from the client-side voice recognizer 202 as a voice operation command 601 corresponding to "voice data (1)" which is voice data 602.

The above-mentioned operation is the first operation of the voice recognition system in accordance with Embodiment 3.

<Second Operation>

Next, the second operation will be explained with reference to FIGS. 11 and 12.

Figure 11:
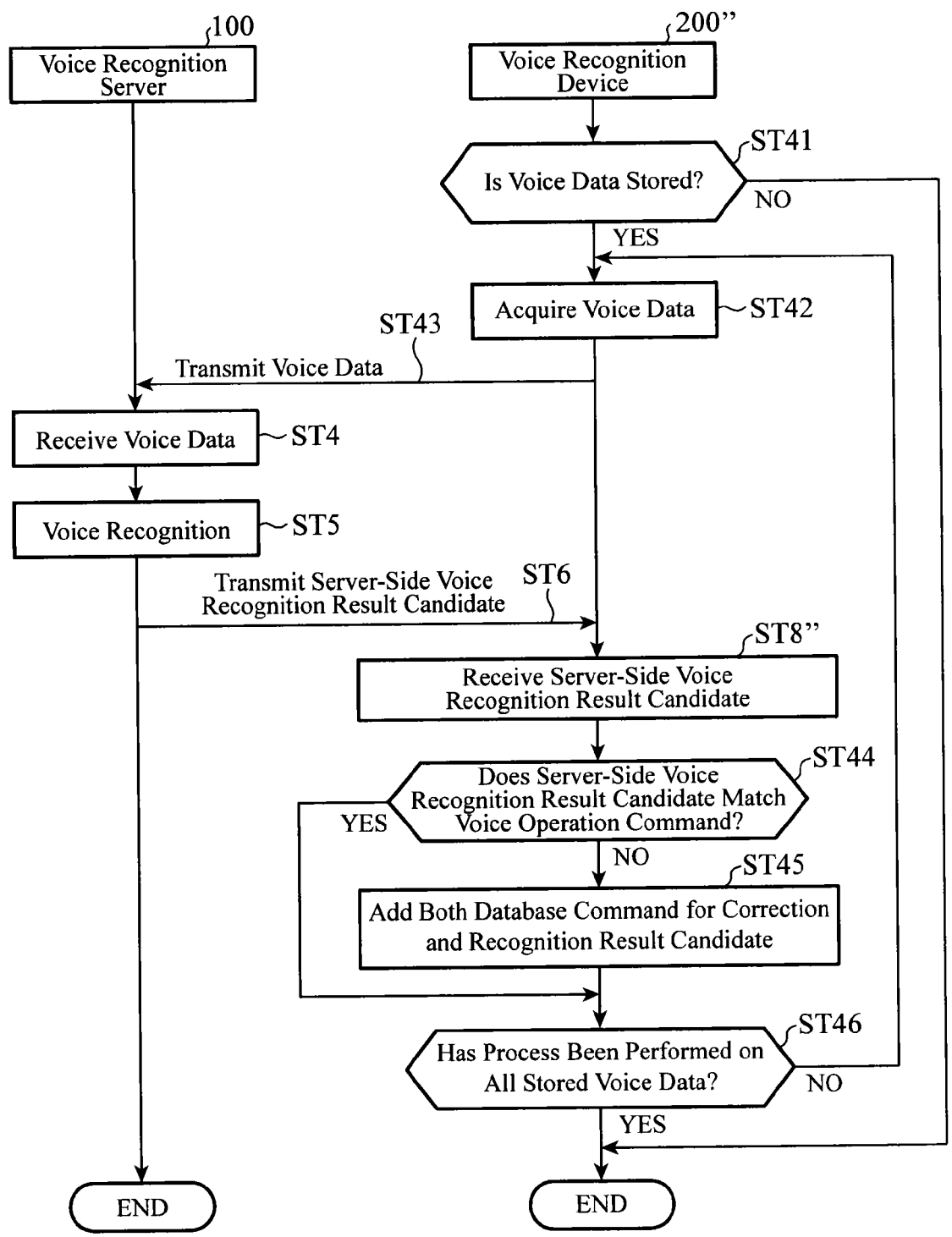
FIG. 11 is a flow chart showing a second operation of the voice recognition system in accordance with Embodiment 3.

FIG. 11 is a flow chart showing the second operation of the voice recognition system in accordance with Embodiment 3 of the present invention, and FIG. 12 is a diagram showing an example of the database for correction of the voice recognition device of the voice recognition system in accordance with Embodiment 3 of the present invention.

When the voice recognition device 200" starts, the recognition result candidate corrector 221 refers to the input voice/recognition result storage 222 to determine whether or not voice data is stored (step ST41). When no voice data is stored (when NO in step ST41), the recognition result candidate corrector ends the processing. In contrast, when voice data is stored (when YES in step ST41), the recognition result candidate corrector acquires the voice data stored in the input voice/recognition result storage 222 (step ST42), and transmits the voice data acquired thereby to the voice recognition server 100 via the transmitter 203 (step ST43).

The voice recognition server 100 performs the same processes as those of steps ST4 to ST6 of above-mentioned Embodiment 1, performs voice recognition on the voice data transmitted thereto, and transmits a server-side voice recognition result candidate to the voice recognition device 200".

The receiver 204 of the voice recognition device 200" receives the server-side voice recognition result candidate transmitted, in step ST6, from the voice recognition server 100, and outputs the server-side voice recognition result candidate received thereby to the recognition result candidate corrector 221 (step ST8"). The recognition result candidate corrector 221 determines whether the server-side voice recognition result candidate inputted in step ST8" matches a voice operation command stored in the input voice/recognition result storage 222 (step ST44). When the server-side voice recognition result candidate and a voice operation command match each other (when YES in step ST44), the recognition result candidate corrector advances to a process of step ST46.

In contrast, when the server-side voice recognition result candidate and a voice operation command do not match each other (when NO in step ST44), the recognition result candidate corrector adds information showing that the server-side voice recognition result candidate is brought, as a correction candidate, into correspondence with a voice operation command to the database 221a for correction (step ST45).

In the example shown in FIG. 12, a voice operation command 701 stored in the input voice/recognition result storage 222 is "メール (mêru (mail))", and, when a correction candidate 702 which is a server-side voice recognition result candidate is "減入る (meiru)" or "見える (mieru)", the recognition result candidate corrector adds, as correct data 700, information showing that they are brought into correspondence with each other to the database 221a for correction.

Next, the recognition result candidate corrector 221 refers to the voice data stored in the input voice/recognition result storage 222 and determines whether the recognition result candidate corrector has processed all the voice data (step ST46). When having processed all the voice data (when YES in step ST46), the recognition result candidate corrector ends the processing. In contrast, when not having processed all the voice data yet (when NO in step ST46), the recognition result candidate corrector returns to the process of step ST42 and repeats the above-mentioned processing.

The above-mentioned operation is the second operation of the voice recognition system in accordance with Embodiment 3.

<Third Operation>

Next, the third operation will be explained with reference to the above-mentioned flow chart of FIG. 9. The explanation of the same processes as those in the above-mentioned first operation will be omitted hereafter.

As step ST32, the recognition result candidate corrector 221 compares the text of a server-side voice recognition result candidate received in step ST8' with the database 221a for correction. For example, when the server-side voice recognition result candidate list 403 shown in FIG. 6 is inputted as server-side voice recognition result candidates, the recognition result candidate corrector compares the text of the server-side voice recognition result candidate 401 with the correction candidates 702 of the correct data 700 which construct the database 221a for correction shown in FIG. 12.

When detecting that the correction candidate "減入る (meiru)" of the database 221a for correction is included in the text of the server-side voice recognition result candidate 401, the recognition result candidate corrector outputs, as a comparison result, both the correction candidate "減入る (meiru)" of the database 221a for correction and the voice operation command "メール (mêru (mail))" corresponding to the correction candidate to the recognition result integrator 206", as step ST33.

Next, the recognition result integrator 206" determines whether or not it is possible to perform text division on a server-side voice recognition result candidate on the basis of the client-side voice recognition result candidate generated, in step ST7, by the client-side voice recognizer 202, an utterance rule determined, in step ST21, by the input rule determinator 211, the server-side voice recognition result candidates received, in step ST8, by the receiver 204, and the comparison result inputted, in step ST33, from the recognition result candidate corrector 221, as step ST34.

For example, when the client-side voice recognition result candidate 404 "メール (mêru (mail))" shown in FIG. 6 is inputted as the client-side voice recognition result candidate provided by the client-side voice recognizer 202, the utterance rule determined by the input rule determinator 211 is "command+free sentence", and the server side voice recognition result list 403 shown in FIG. 6 is inputted from the receiver 204, because "メール (mêru (mail))" is not included in the texts of the server side voice recognition results 401 and 402 of the server side voice recognition result list 403, but "メール (mêru (mail))" is inputted as the comparison result from the recognition result candidate corrector 221, the recognition result integrator determines that it is possible to divide the texts (when YES in step ST34).

The recognition result integrator 206" divides the text of a server-side voice recognition result candidate by using the correction candidate "滅入る (meiru)" corresponding to the determination result "メール (mêru (mail))" as a reference, as step ST35. The recognition result integrator further combines a text after division based on the information about the utterance rule inputted from the input rule determinator 211, and the voice operation command corresponding to the client-side voice recognition result candidate, to generate a voice recognition result, as step ST24, and outputs the voice recognition result to the outputter 207, as step ST16.

The above-mentioned operation is the third operation of the voice recognition system in accordance with Embodiment 3.

As mentioned above, because the voice recognition device 200' in accordance with this Embodiment 3 is configured in such away as to include the recognition result candidate corrector 221 that, when the voice recognition device 200" starts, generates the database 211*a* for correction of voice recognition result candidates on the basis of server-side voice recognition result candidates which the recognition result candidate corrector acquires by using voice data inputted in past and transmitting voice data to the voice recognition server 100, also when any server-side voice recognition result candidate provided by the voice recognition server 100 does not match a voice operation command stored in the input voice/recognition result storage 222, if a correction candidate corresponding to a voice operation command matches a server-side voice recognition result candidate from the voice recognition server 100, the voice recognition device can divide the test by using the portion as a reference, and integrate a text after division and the text of the client-side voice recognition result candidate provided by the voice recognition device 200" on the basis of the information about the utterance rule which is inputted from the input rule determinator 211.

As a result, even if the voice recognition server 100 is updated and a change occurs in a recognition result, the voice recognition system can follow the update, and integrate a voice recognition result candidate provided by the server side and a voice recognition result candidate provided by the client side and output a more precise voice recognition result.

Further, because the recognition result integrator 206" in accordance with this Embodiment 3 is configured in such a way as to divide the text by using a portion having a difference as a reference, and integrates a text after division and the text of the client-side voice recognition result candidate provided by the voice recognition device 200' on the basis of the information about the utterance rule which is inputted from the input rule determinator 211, even if the voice recognition server 100 cannot recognize a voice operation command with a high degree of accuracy, the voice recognition system can use only a portion of a document without using a portion corresponding to a voice operation command, and output a more precise voice recognition result.

In addition, because the voice recognition system in accordance with this Embodiment 3 is configured in such a way as to include the recognition result candidate corrector 221 that compares the text of a server-side voice recognition result candidate with the database 221*a* for correction without performing a complicated syntactic analyzing process and re-calculation of recognition scores, the functions of the voice recognition device 200" can be implemented while the processing load on a CPU is suppressed.

Further, because the voice recognition system in accordance with this Embodiment 3 is configured in such a way as to suppress the amount of computations without performing a complicated syntactic analysis by comparing the text of a server-side voice recognition result candidate with the database 221*a* for correction to detect a portion having low reliability, the functions of the voice recognition device 200" can be implemented by using a CPU having low arithmetic performance.

In addition, because the voice recognition system in accordance with this Embodiment 3 is configured in such a way that the voice recognition device 200" transmits the voice data to the voice recognition server 100 at the same time when the voice recognition device inputs the voice data to the client-side voice recognizer 202, as compared with a method of transmitting the voice data to the voice recognition server 100 after the voice recognition device 200 acquires a client-side voice recognition result candidate, a voice recognition result can be acquired at an earlier time from the voice recognition server 100, and the delay time which has elapsed until the voice recognition device decides and outputs a voice recognition result can be shortened.

Embodiment 4

Although the configuration in which the voice recognition system detects a change of a server-side voice recognition result candidate provided by the voice recognition server 100, and makes it possible to divide the text at all times is shown in above-mentioned Embodiment 3, in this Embodiment 4, a configuration will be shown in which a voice recognition system detects a proper noun included in a text after division as a free sentence.

The voice recognition system in accordance with this Embodiment 4 is also configured with a voice recognition server 100 and a voice recognition device 200'. Because the components of the voice recognition server 100 and the voice recognition device 200' in accordance with Embodiment 4 are the same as those of the voice recognition system in accordance with Embodiment 2, the description of the components will be omitted hereafter. In the following explanation, an explanation will be made with the same components being designated by the same reference numerals as those used in FIG. 4.

A recognition result candidate comparator 205 has a function of, when comparing server side voice recognition candidates and detecting a plurality of positions where portions have a difference, determining whether the texts at the detected positions have the same contents, in addition to the function explained in Embodiment 2. When the recognition result candidate comparator 205 determines that the texts at the detected positions have the same contents, a recognition result integrator 206' replaces each of the texts which are determined to have the same contents with a corresponding proper noun.

Next, operations of the voice recognition system in accordance with Embodiment 4 will be explained with reference to FIGS. 13 to 15.

Figure 13:
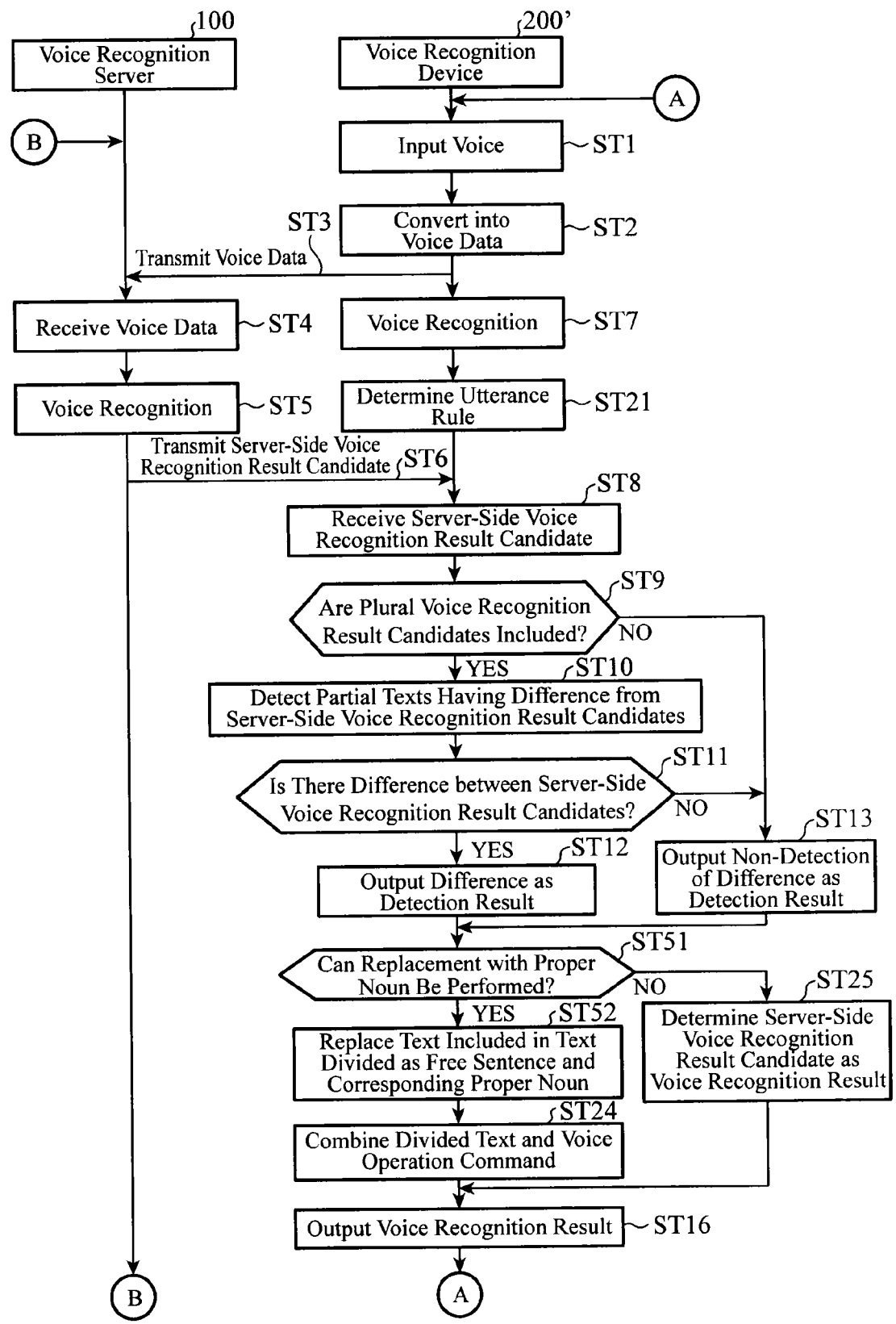
FIG. 13 is a flow chart showing operations of a voice recognition system in accordance with Embodiment 4.

FIG. 13 is a flow chart showing the operations of the voice recognition system in accordance with Embodiment 4 of the present invention. FIG. 14 shows an example of the generation of a voice recognition result by the voice recognition system in accordance with Embodiment 4 of the present invention, and FIG. 15 is a diagram showing an example of the storage of utterance rule patterns. Hereafter, the same steps as those of the voice recognition system in accordance with Embodiment 2 are designated by the same reference characters as those used in FIG. 5, and the explanation of the steps will be omitted or simplified.

First, the voice recognition device 200' performs processes of steps ST1 and ST2, and a client-side voice recognizer 202 performs voice recognition on inputted voice data, like those in accordance with Embodiment 2 (step ST7).

Figure 14:
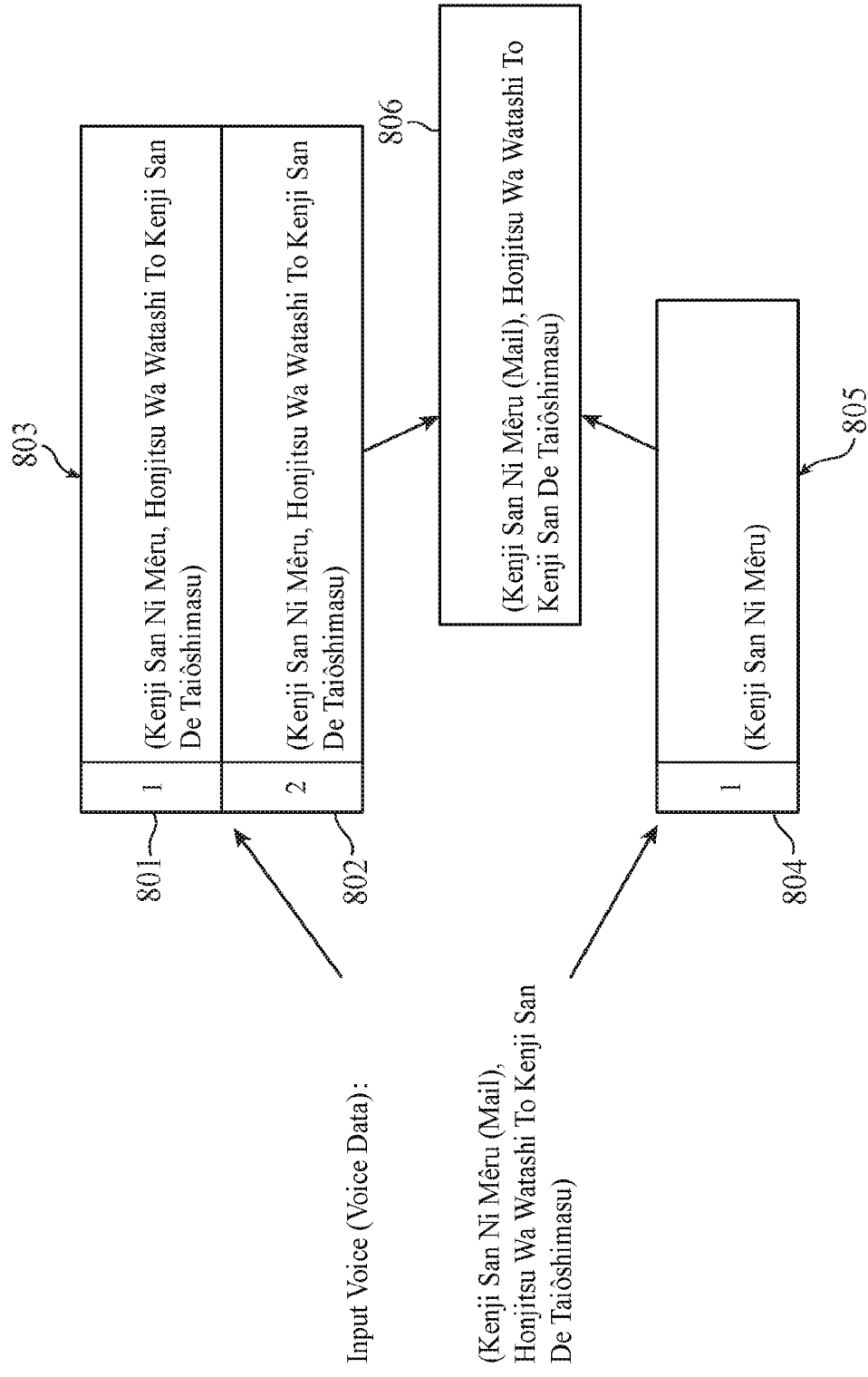
FIG. 14 is a diagram showing an example of the generation of a voice recognition result by the voice recognition system in accordance with Embodiment 4.

For example, when the client-side voice recognizer 202 sets only a proper noun, which is registered in an address book or the like, and a voice operation command as an object to be recognized, in the example shown in FIG. 14, the client-side voice recognizer performs voice recognition on voice data inputted by a user "健児さんにメール、本日は私と健児さんで対応します (Kenji san ni mêru (mail), honjitsu wa watashi to Kenji san de taiôshimasu)", recognizes "健児 (Kenji)", which is a proper noun, and "さんにメール (san ni mêru (mail))", which is a voice operation command, and acquires a client-side voice recognition result candidate 804 "健児さんにメール (Kenji san ni mêru (mail))." In the example of FIG. 14, a client-side voice recognition result candidate list 805 consists of the single client-side voice recognition result candidate 804. The acquired client-side voice recognition result candidate is outputted to the recognition result integrator 206' and an input rule determinator 211.

Next, the input rule determinator 211 refers to both the client-side voice recognition result candidate inputted thereto from the client-side voice recognizer 202 and the utterance rule patterns stored in an input rule storage 212, to verify a voice operation command, and determines the utterance rule of the voice data inputted in step ST1 (step ST21).

For example, when a comparison is made between the client-side voice recognition result candidate 804 "健児さんにメール (Kenji san ni mêru (mail))" shown in FIG. 14, and the utterance rule patterns 900 shown in FIG. 15, a matching voice operation command 901 "さんにメール (san ni mêru (mail))" is detected, and the corresponding utterance rule 902 "proper noun+command+free sentence" of the input voice is acquired. The acquired utterance rule of the input voice is outputted to recognition result integrator 206'.

The voice recognition device 200' further performs processes of steps ST8 and ST9, and, when the recognition result candidate comparator 205 determines that a plurality of voice recognition result candidates are included (when YES in step ST9), the recognition result candidate comparator 205 compares the texts of the voice recognition result candidates to detect partial texts having a difference (step ST10). The recognition result candidate comparator 205 determines whether it has detected partial texts having a difference (step ST11), and, when having detected partial texts having a difference (when YES in step ST11), outputs the partial texts having a difference to the recognition result integrator 206' as a detection result (step ST12).

Because two server-side voice recognition result candidates 801 and 802 are included in a server side voice recognition result list 803 in the example of FIG. 14, the recognition result candidate comparator compares "検事さんにメール、本日は私と検事さんで対応します (kenji san ni mêru (mail), honjitsu wa watashi to Kenji san de taiôshimasu)" and "賢治さんにメール、本日は私と賢治さんで対応します (Kenji san ni mêru (mail), honjitsu wa watashi to Kenji san de taiôshimasu)" which are the pieces of text information of the candidates, and detects that two portions each having a difference exist and both of the two portions have the same text ("検事 (kenji)" in the voice recognition result candidate 801, and "賢治 (Kenji)" in the voice recognition result candidate 802).

The recognition result integrator 206' determines whether or not it is possible to perform replacement with a proper noun included in the text of a free sentence on the basis of the client-side voice recognition result candidate generated, in step ST7, by the client-side voice recognizer 202, the utterance rule determined, in step ST21, by the input rule determinator 211, the server-side voice recognition result candidates received, in step ST8, by a receiver 204, and the result of the detection of a difference which is inputted, in step ST12 or ST13, from the recognition result candidate comparator 205 (step ST51).

The determination of whether or not it is possible to perform replacement with a proper noun is concretely performed as follows.

In the examples of FIGS. 14 and 15, when the client-side voice recognition result candidate 804 "健児さんにメール (Kenji san ni mêru (mail))" provided by the client-side voice recognizer 202 is inputted, and the server-side voice recognition result candidate list 803 which consists of the server-side voice recognition result candidates 801 and 802 is inputted from the receiver 204, the recognition result integrator determines whether a voice operation command "さんにメール (san ni mêru (mail))" is included in the text of each of the server-side voice recognition result candidates 801 and 802.

When determining that a voice operation command is included, according to the information about the utterance rule inputted from the input rule determinator 211 (the utterance rule "proper noun+command+free sentence" of the input voice which corresponds to the voice operation command "さんにメール (san ni mêru (mail))" shown in FIG. 15), the recognition result integrator divides each of the server-side voice recognition result candidates into a text corresponding to a proper noun (in the example of FIG. 14, "検事 (kenji)" of the server-side voice recognition result candidate 801, and "賢治 (Kenji)" of the server-side voice recognition result candidate 802), and a text corresponding to a free sentence (in the example of FIG. 14, "本日は私と検事さんで対応します (honjitsu wa watashi to kenji san de taiôshimasu)" of the server-side voice recognition result candidate 801, and "本日は私と賢治さんで対応します (honjitsu wa watashi to Kenji san de taiôshimasu)" of the server-side voice recognition result candidate 802) by using the text of the voice operation command as a reference.

The recognition result integrator further determines whether a portion matching the text of a proper noun exists in the text corresponding to the free sentence (in the example of FIG. 14, the recognition result integrator determines that a portion matching the text of a proper noun ("検事 (kenji)" of the voice recognition result candidate 801 and "賢治 (Kenji)" of the voice recognition result candidate 802) exists in the free sentence). Then, when a portion matching the text of a proper noun exists in the free sentence, the recognition result integrator determines that it is possible to perform replacement with the proper noun.

When determining that it is possible to perform replacement with the proper noun (when YES in step ST51), the recognition result integrator replaces the proper noun included in the text after division as a free sentence with the corresponding text on the basis of the detection result inputted from the recognition result candidate comparator 205 (step ST52).

In the example of FIG. 14, the recognition result integrator replaces the text "検事 (kenji)" corresponding to the proper noun, which is included in the text "本日は私と検事さんで対応します (honjitsu wa watashi to kenji san de taiôshimasu)" after division as a free sentence, with the text "健児 (Kenji)" of the proper noun which is recognized by the client-side voice recognizer 202, to determine "本日は私と健 児さんで対 応します (honjitsu wa watashi to Kenji san de taiôshimasu)."

The recognition result integrator 206' combines the text after division and the voice operation command corresponding to the client-side voice recognition result candidate on the basis of the information about the utterance rule inputted from the input rule determinator 211, to decide a voice recognition result (step ST24). The decided voice recognition result is outputted to an outputter 207 (step ST16).

In the example of FIG. 14, the recognition result integrator decides "健児さんにメール、本日は私と健児さんで対応します (Kenji san ni mêru (mail), honjitsu wa watashi to Kenji san de taiôshimasu)", which is acquired by combining the proper noun " 健児 (Kenji)" and the voice operation command "さんにメール (san ni mêru (mail))", and the text "本日は私と健 児さんで対応 します (honjitsu wa watashi to Kenji san de taiôshimasu)" corresponding to the free sentence on the basis of the utterance rule "proper noun+command+free sentence", as a voice recognition result.

In contrast, when determining that it is not possible to perform replacement with the proper noun (when NO in step ST51), the recognition result integrator 206' determines a server-side voice recognition result candidate received in step ST8 as a voice recognition result (step ST25), and outputs this voice recognition result to the outputter 207 (step ST16).

As mentioned above, because the voice recognition system in accordance with this Embodiment 4 is configured in such a way as to, when a plurality of server-side voice recognition result candidates are acquired from the voice recognition server 100, compare the texts of the server-side voice recognition result candidates to detect partial texts having a difference, and, when a partial text having a difference corresponds to a recognition result of a proper noun in the client-side voice recognition result candidate, and a text corresponding to a proper noun is included also in a text after division as a free sentence, replace the text of the proper noun included in the text of the free sentence with the text of the proper noun which is recognized by the client-side voice recognizer 202, also when part of speech information is not provided for each of the server-side voice recognition result candidates, the voice recognition system can integrate a voice recognition result provided by the server side and a voice recognition result candidate provided by the client side with a high degree of accuracy without using part of speech information, and output a more precise voice recognition result.

Although the example in which the voice operation command "さんにメール (san ni mêru (mail))" is recognized correctly is shown in above-mentioned Embodiment 4, a configuration can be provided in which by combining the function of the recognition result candidate corrector 221 shown in Embodiment 3, and that of the input voice/recognition result storage 222 shown in Embodiment 3, when the recognition result integrator 206' does not correctly recognize the voice operation command as a server-side voice recognition result candidate of the voice recognition server 100, by searching through a database 221a for correction to refer to a voice recognition result command which serves as a correction candidate, it is determined that it is possible to divide the text by using a voice operation command as a reference. As a result, even if the voice operation command has not been normally recognized by the voice recognition server 100, the voice recognition system can divide the text with a high degree of accuracy and output a more precise voice recognition result.

Embodiment 5

Although the processing operations of the voice recognition system are explained in above-mentioned Embodiment 1 by providing, as an example, the case in which a voice which a user utters in Japanese is inputted, processing operations of a voice recognition system will be explained in this Embodiment 5 by providing, as an example, a case in which a voice which a user utters in English is inputted. Because the configuration and the operations of the voice recognition system in accordance with this Embodiment 5 are the same as the configuration (refer to FIG. 1) and the operations (refer to FIG. 2) which are shown in Embodiment 1, the configuration and the operations will be explained by using FIGS. 1 and 2.

Figure 16:
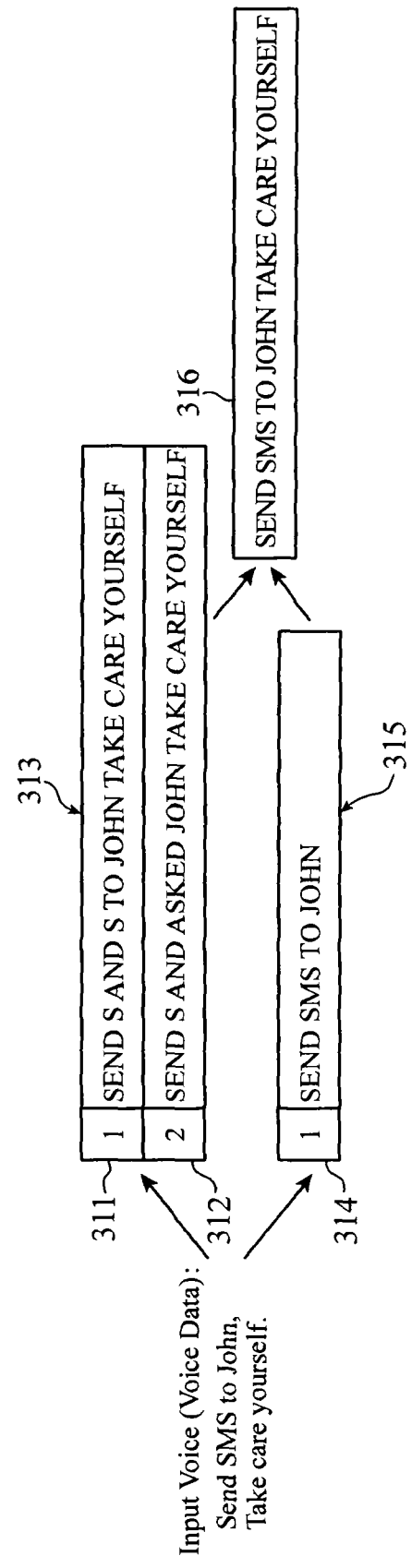
FIG. 16 is a diagram showing an example of the generation of a voice recognition result by a voice recognition system in accordance with Embodiment 5.

An operation of the voice recognition system at the time when a voice uttered in English is inputted will be explained along with the flow chart of FIG. 2, and with reference to a concrete example of FIG. 16. FIG. 16 is a diagram showing an example of the generation of a voice recognition result by the voice recognition system in accordance with Embodiment 5 of the present invention.

In step ST5, for example, a server-side voice recognizer 102 sets an arbitrary document as an object to be recognized and performs voice recognition on voice data "Send SMS to John, Take care yourself." received from a voice recognition device 200, and acquires a server-side voice recognition result candidate list 313 including "SEND S AND S TO JOHN TAKE CARE YOURSELF" which is a server-side voice recognition result candidate 311 shown in FIG. 16 and "SEND S AND ASKED JOHN TAKE CARE YOURSELF" which is a server-side voice recognition result candidate 312 shown in FIG. 16.

On the other hand, in step ST7, for example, a client-side voice recognizer 202 sets only a command for voice operation, and information about a person's name, which is registered in advance in an address book, as an object to be recognized, and, when a user inputs a voice "Send SMS to John, Take care yourself.", the client-side voice recognizer 202 recognizes "SEND SMS TO" which is a voice operation command, and "JOHN" which is a person's name, and acquires a client-side voice recognition result candidate list 315 including "SEND SMS TO JOHN" which is a client-side voice recognition result candidate 314 shown in FIG. 16. In the example of FIG. 16, the client-side voice recognition result candidate list 315 consists of only the single client-side voice recognition result candidate 314.

Next, in step ST11, in the example of FIG. 16, the two server-side voice recognition result candidates 311 and 312 are included in the server-side voice recognition result candidate list 313, and "SEND SAND S TO JOHN TAKE CARE YOURSELF" and "SEND S AND ASKED JOHN TAKE CARE YOURSELF" which are the pieces of text information of the candidates are compared and portions each enclosed by the leading text "SEND S AND" and the trailing text "JOHN TAKE CARE YOURSELF" are detected as partial texts having a difference. Concretely, "S TO" of the server-side voice recognition result candidate 311, and "ASKED" of the server-side voice recognition result candidate 312 are detected as partial texts having a difference.

Next, in step ST15, in the example of FIG. 16, when the partial text "S TO" in the server-side voice recognition result candidate 311 and the partial text "ASKED", each of which is enclosed by the leading text "SEND S AND" and the trailing text "JOHN TAKE CARE YOURSELF", are detected as partial texts having a difference, a search of whether a partial text matching "SEND S AND" and a partial text matching "JOHN" exist in the client-side voice recognition result candidate 314 is made. In the example of FIG. 16, "JOHN" is included, but the partial text "SEND S AND" is not included. In this case, the partial text to be searched for is shortened to a one like "SEND", and a re-search is performed by using the shortened partial text. In the example of FIG. 16, as a result of the re-search, "SMS TO" enclosed by "SEND" and "JOHN" is retrieved. After that, "S AND S TO" enclosed by "SEND" and "JOHN" of the server-side voice recognition result candidate 311 is replaced by "SMS TO" which is retrieved, and a voice recognition result 316 "SEND SMS TO JOHN TAKE CARE YOURSELF" is acquired.

As mentioned above, the voice recognition system in accordance with this Embodiment 5 can provide the same advantages as those provided by Embodiment 1 also when a voice uttered in English is inputted to the voice recognition device 200.

Embodiment 6

Although the processing operations of the voice recognition system are explained in above-mentioned Embodiment 2 by providing, as an example, the case in which a voice which a user utters in Japanese is inputted, processing operations of a voice recognition system will be explained in this Embodiment 6 by providing, as an example, a case in which a voice which a user utters in English is inputted. Because the configuration and the operations of the voice recognition system in accordance with this Embodiment 6 are the same as the configuration (refer to FIG. 4) and the operations (refer to FIG. 5) which are shown in Embodiment 2, the configuration and the operations will be explained by using FIGS. 4 and 5.

Figure 17:
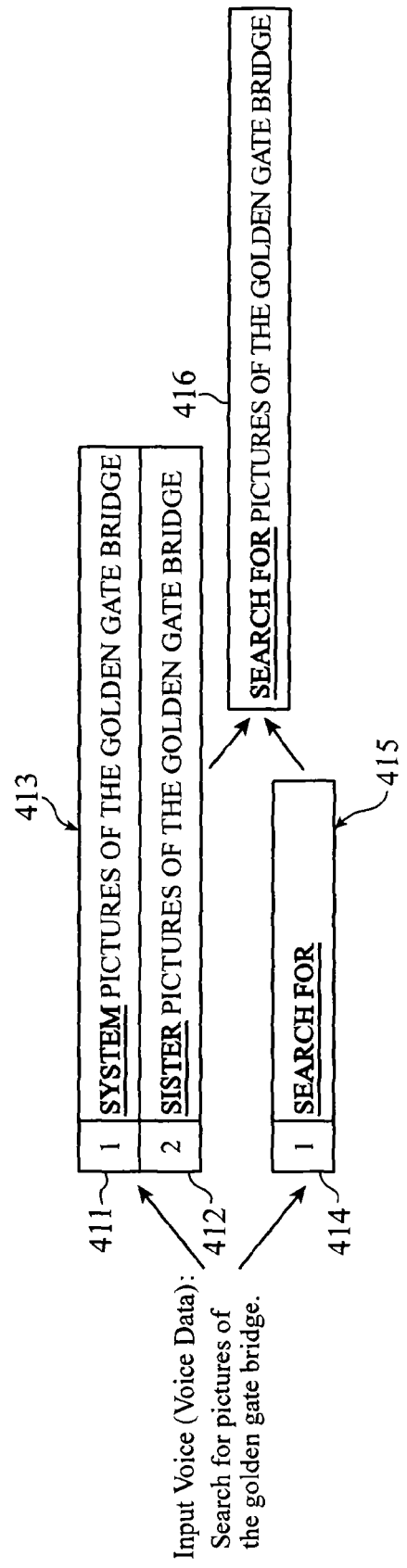
FIG. 17 is a diagram showing an example of the generation of a voice recognition result by a voice recognition system in accordance with Embodiment 6.

An operation of the voice recognition system at the time when a voice uttered in English is inputted will be explained along with the flow chart of FIG. 5, and with reference to a concrete example of FIGS. 17 and 18. FIG. 17 is a diagram showing an example of the generation of a voice recognition result by the voice recognition system in accordance with Embodiment 6 of the present invention, and FIG. 18 is a diagram showing an example of the storage of utterance rule patterns.

First, a voice recognition device 200' performs processes of steps ST1, ST2, and ST7, and performs voice recognition on inputted voice data, like that in accordance with Embodiment 2.

For example, when a client-side voice recognizer 202 sets only a voice operation command as an object to be recognized, in the example shown in FIG. 17, the client-side voice recognizer performs voice recognition on a user's inputted voice data "Search for pictures of the golden gate bridge.", and acquires one client-side voice recognition result candidate 414 "SEARCH FOR." In the example of FIG. 17, a client side voice recognition result list 415 consists of the single client-side voice recognition result candidate 414.

Next, an input rule determinator 211, in step ST21, refers to both the client-side voice recognition result candidate inputted thereto from the client-side voice recognizer 202, and utterance rule patterns stored in an input rule storage 212, to verify a voice operation command, and determines the utterance rule of the voice data inputted in step ST1.

In the example shown in FIG. 18, each utterance rule pattern 510 stored in the input rule storage 212 consists of a voice operation command 511 and an utterance rule 512 of the input voice. It is shown in the figure that, for example, when the voice operation command 511 is "SEARCH FOR", "command+key word" is acquired as the utterance rule 512 of the input voice.

In the example shown in FIG. 17, when the client-side voice recognition result candidate 414 is "SEARCH FOR", the input rule determinator 211 acquires "command+key word" which is the utterance rule 512 of the input voice which corresponds to "SEARCH FOR" which is the matching voice operation command 511.

On the other hand, in steps ST4 to ST6, when the server-side voice recognizer 102 sets an arbitrary document as an object to be recognized, in the example of FIG. 17, the server-side voice recognizer performs voice recognition on the received voice data "Search for pictures of the golden gate bridge." and acquires a server-side voice recognition result candidate 411 "SYSTEM PICTURES OF THE GOLDEN GATE BRIDGE" and a server-side voice recognition result candidate 412 "SISTER PICTURES OF THE GOLDEN GATE BRIDGE." As a server-side voice recognition result candidate list 413, the acquired two server-side voice recognition result candidates 411 and 412 are outputted to the voice recognition device 200'.

Next, the voice recognition device 200' performs processes of steps ST8 to ST13. In the detection, in step ST10, of partial texts having a difference, as will be explained by taking, as an example, the case of FIG. 17, the voice recognition device compares the server-side voice recognition result candidate 411 "SYSTEM PICTURES OF THE GOLDEN GATE BRIDGE" and the server-side voice recognition result candidate 412 "SISTER PICTURES OF THE GOLDEN GATE BRIDGE" in the server-side voice recognition result candidate list 413, and detects "SYSTEM" and "SISTER" as partial texts having a difference. The detection result is outputted to a recognition result integrator 206'.

The recognition result integrator 206', in step ST22, determines whether or not it is necessary to perform text division on a server-side voice recognition result candidate on the basis of the client-side voice recognition result candidate generated, in step ST7, by the client-side voice recognizer 202, the utterance rule determined, in step ST21, by the input rule determinator 211, the server-side voice recognition result candidates received, in step ST8, by a receiver 204, and the result of the detection of a difference which is inputted, in step ST12 or ST13, from a recognition result candidate comparator 205.

In the examples of FIGS. 17 and 18, when the client-side voice recognition result candidate 414 "SEARCH FOR" provided by the client-side voice recognizer 202 is inputted, and the server-side voice recognition result candidate list 413 which consists of the server-side voice recognition result candidates 411 and 412 is inputted from the receiver 204, because "SEARCH FOR" is not included in the texts of the server-side voice recognition result candidates 411 and 412, the utterance rule inputted from the input rule determinator 211 is "command+key word", and the detection result showing that a difference is detected is inputted from the recognition result candidate comparator 205, it is determined that it is necessary to divide the text.

When it is necessary to perform text division on a server-side voice recognition result candidate (when YES in step ST22), the recognition result integrator 206', in step ST23, performs text division on the text of a server-side voice recognition result candidate received by the receiver 204 by using a partial text having a difference as a reference.

Because as to the text of the server-side voice recognition result candidate 411, "SYSTEM" is detected as a partial text having a difference in the example shown in FIG. 17, the text is divided into two texts: "SYSTEM" and "PICTURES OF THE GOLDEN GATE BRIDGE."

Next, the recognition result integrator 206', as step ST24, combines a text after division of step ST23 and the voice operation command corresponding to the client-side voice recognition result candidate on the basis of the utterance rule inputted from the input rule determinator 211, and outputs a combined result, as a voice recognition result, to an outputter 207.

In the example shown in FIG. 17, "SEARCH FOR PICTURES OF THE GOLDEN GATE BRIDGE" which is acquired by combining the voice operation command "SEARCH FOR" and the text after division "PICTURES OF THE GOLDEN GATE BRIDGE" which corresponds to a free sentence on the basis of the utterance rule "command+key word" is provided as a voice recognition result.

As mentioned above, the voice recognition system in accordance with this Embodiment 6 can provide the same advantages as those provided by Embodiment 2 also when a voice uttered in English is inputted to the voice recognition device 200'.

Embodiment 7

Although the processing operations of the voice recognition system are explained in above-mentioned Embodiment 3 by providing, as an example, the case in which a voice which a user utters in Japanese is inputted, processing operations of a voice recognition system will be explained in this Embodiment 7 by providing, as an example, a case in which a voice which a user utters in English is inputted. Because the configuration and the operations of the voice recognition system in accordance with this Embodiment 7 are the same as the configuration (refer to FIG. 8) and the operations (refer to FIGS. 9 and 11) which are shown in Embodiment 3, the configuration and the operations will be explained by using FIGS. 8, 9, and 11.

Hereafter, the operations will be explained by dividing the operations into an operation, as a first operation, at the time when a voice input uttered in English is made in a state in which no data is stored in an input voice/recognition result storage 222, an operation, as a second operation, of generating a database 221a for correction when a voice recognition device 200" is started, and an operation, as a third operation, at the time when a voice input uttered in English is made in a state in which data is stored in the input voice/recognition result storage 222 and the database 221a for correction has been generated, like in the case of Embodiment 3.

<First Operation>

First, the first operation will be explained with reference to FIGS. 9 and 19, and FIG. 17 shown in Embodiment 6. The explanation of the same operation as that shown in Embodiment 3 will be omitted hereafter.

FIG. 19 is a diagram showing an example of the storage in the input voice/recognition result storage of the voice recognition system in accordance with Embodiment 7.

In step ST34 of the flow chart of FIG. 9, a recognition result integrator 206" determines whether or not it is possible to perform text division on a server-side voice recognition result candidate on the basis of a client-side voice recognition result candidate generated, in step ST7, by a client-side voice recognizer 202, an utterance rule determined, in step ST21, by an input rule determinator 211, server-side voice recognition result candidates received, in step ST8', by a receiver 204, and a comparison result acquired, in step ST33, by a recognition result candidate corrector 221.

For example, when the client-side voice recognition result candidate 414 "SEARCH FOR" shown in FIG. 17 is inputted as the client-side voice recognition result candidate provided by the client-side voice recognizer 202, and the server side voice recognition result list 413 shown in FIG. 17 is inputted from the receiver 204, "SEARCH FOR" is not included in the texts of the server-side voice recognition result candidates 411 and 412 included in the above-mentioned server side voice recognition result list 413. Further, the utterance rule inputted from the input rule determinator 211 is "command+key word", and the comparison result that there is no correction candidate is inputted from the recognition result candidate corrector 221. As a result, the recognition join integrator 206" determines that it is impossible to divide the texts.

In contrast, when it is not possible to perform text division on a server-side voice recognition result candidate (when NO in step ST34), the recognition result integrator 206", in steps ST36 and ST37, determines the client-side voice recognition result candidate acquired in step ST7 as a voice recognition result, and stores this voice recognition result in the input voice/recognition result storage 222.

In the example shown in FIG. 19, the recognition result integrator stores the voice recognition result "SEARCH FOR" inputted from the client-side voice recognizer 202 as a voice operation command 611 corresponding to "voice data (1)" which is voice data 612.

The above-mentioned operation is the first operation of the voice recognition system in accordance with Embodiment V.

<Second Operation>

Next, the second operation will be explained with reference to FIGS. 11 and 20.

FIG. 20 is a diagram showing an example of the database for correction of the voice recognition device of the voice recognition system in accordance with Embodiment 7 of the present invention.

When a server-side voice recognition result candidate and a voice operation command do not match each other in step ST44 of the flow chart of FIG. 11 (when NO in step ST44), the recognition result candidate corrector, as step ST45, adds information showing that the server-side voice recognition result candidate is brought, as a correction candidate, into correspondence with the voice operation command to the database 221a for correction.

In the example shown in FIG. 20, a voice operation command 711 stored in the input voice/recognition result storage 222 is "SEARCH FOR", and, when a correction candidate 712 which is a server-side voice recognition result candidate is "SYSTEM" or "SISTER", the recognition result candidate corrector adds, as correct data 710, information showing that they are brought into correspondence with each other to the database 221a for correction.

The above-mentioned operation is the second operation of the voice recognition system in accordance with Embodiment 7.

<Third Operation>

Next, the third operation will be explained with reference to above-mentioned FIG. 9.

The recognition result candidate corrector 221, as step ST32, compares the text of a server-side voice recognition result candidate received in step ST8' with the database 221a for correction. For example, when the server-side voice recognition result candidate list 413 shown in FIG. 17 is inputted as server-side voice recognition result candidates, the recognition result candidate corrector compares the text of the server-side voice recognition result candidate 411 with the correction candidates 712 of the correct data 710 which construct the database 221a for correction shown in FIG. 20.

When detecting that the correction candidate "SYSTEM" of the database 221a for correction is included in the text of the server-side voice recognition result candidate 411, the recognition result candidate corrector outputs, as a comparison result, both the correction candidate "SYSTEM" of the database 221a for correction and the voice operation command "SEARCH FOR" corresponding to the correction candidate to the recognition result integrator 206", as step ST33.

Next, the recognition result integrator 206", as step ST34, determines whether or not it is possible to perform text division on a server-side voice recognition result candidate on the basis of the client-side voice recognition result candidate generated, in step ST7, by the client-side voice recognizer 202, an utterance rule determined, in step ST21, by the input rule determinator 211, the server-side voice recognition result candidates received, in step ST8, by the receiver 204, and the comparison result inputted, in step ST33, from the recognition result candidate corrector 221.

For example, when the client-side voice recognition result candidate 414 "SEARCH FOR" shown in FIG. 17 is inputted as the client-side voice recognition result candidate provided by the client-side voice recognizer 202, the utterance rule determined by the input rule determinator 211 is "command+key word", and the server side voice recognition result list 413 shown in FIG. 17 is inputted from the receiver 204, because "SEARCH FOR" is not included in the texts of the server side voice recognition results 411 and 412 of the server side voice recognition result list 413, but "SEARCH FOR" is inputted as the comparison result from the recognition result candidate corrector 221, the recognition result integrator determines that it is possible to divide the texts (when YES in step ST34).

The recognition result integrator 206", as step ST35, divides the text of a server-side voice recognition result candidate by using the correction candidate "SYSTEM" corresponding to the determination result "SEARCH FOR" as a reference. The recognition result integrator further, as step ST24, combines a text after division on the basis of the information about the utterance rule inputted from the input rule determinator 211, and the voice operation command corresponding to the client-side voice recognition result candidate, to generate a voice recognition result, and, as step ST16, outputs the voice recognition result to an outputter 207.

The above-mentioned operation is the third operation of the voice recognition system in accordance with Embodiment 3.

As mentioned above, the voice recognition system in accordance with this Embodiment 7 can provide the same advantages as those provided by Embodiment 3 also when a voice uttered in English is inputted to the voice recognition device 200".

Embodiment 8

Although the processing operations of the voice recognition system are explained in above-mentioned Embodiment 4 by providing, as an example, the case in which a voice which a user utters in Japanese is inputted, processing operations of a voice recognition system will be explained in this Embodiment 8 by providing, as an example, a case in which a voice which a user utters in English is inputted. Because the configuration and the operations of the voice recognition system in accordance with this Embodiment 8 are the same as the configuration (refer to FIG. 8) which is shown in Embodiment 3 and the operations (refer to FIG. 13) which are shown in Embodiment 4, the configuration and the operations will be explained by using FIGS. 8 and 13.

Figure 21:
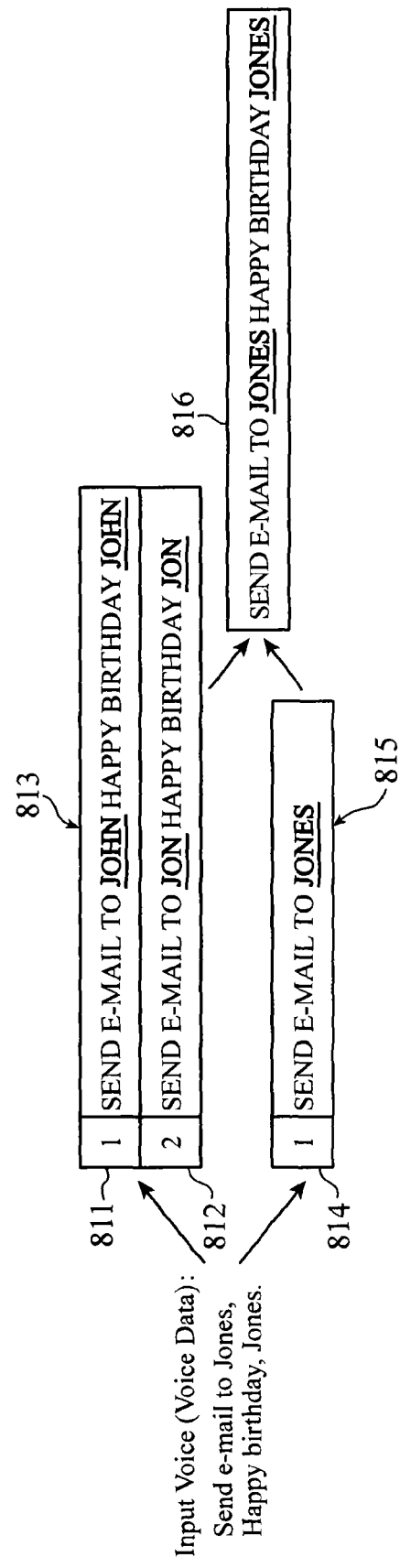
FIG. 21 is a diagram showing an example of the generation of a voice recognition result by a voice recognition system in accordance with Embodiment 8.

An operation of the voice recognition system at the time when a voice uttered in English is inputted will be explained along with the flow chart of FIG. 13, and with reference to a concrete example of FIGS. 21 and 22. FIG. 21 is a diagram showing an example of the generation of a voice recognition result by the voice recognition system in accordance with Embodiment 8 of the present invention, and FIG. 22 is a diagram showing an example of the storage of utterance rule patterns.

First, in step ST7 of the flow chart of FIG. 13, a client-side voice recognizer 202 performs voice recognition on inputted voice data.

For example, when the client-side voice recognizer 202 sets only a proper noun, which is registered in an address book or the like, and a voice operation command as an object to be recognized, in the example shown in FIG. 21, the client-side voice recognizer performs voice recognition on voice data inputted by a user "Send e-mail to Jones, Happy birthday, Jones.", recognizes "SEND E-MAIL TO", which is a voice operation command, and "JONES", which is a proper noun, and acquires a client-side voice recognition result candidate 814 "SEND E-MAIL TO JONES." In the example of FIG. 21, a client-side voice recognition result candidate list 815 consists of the single client-side voice recognition result candidate 814. The acquired client-side voice recognition result candidate is outputted to a recognition result integrator 206' and an input rule determinator 211.

Next, the input rule determinator 211, in step ST21, refers to both the client-side voice recognition result candidate inputted thereto from the client-side voice recognizer 202 and utterance rule patters stored in an input rule storage 212, to verify a voice operation command, and determines the utterance rule of the voice data inputted in step ST1.

For example, when a comparison is made between the client-side voice recognition result candidate 814 "SEND E-MAIL TO JONES." shown in FIG. 21, and the utterance rule patterns 910 shown in FIG. 22, a matching voice operation command 911 "SEND E-MAIL TO" is detected, and the corresponding utterance rule 912 "command+proper noun+free sentence" of the input voice is acquired. The acquired utterance rule of the input voice is outputted to the recognition result integrator 206'.

Next, a recognition result candidate comparator 205, in step ST11, determines whether it has detected partial texts having a difference, and, when having detected partial texts having a difference (when YES in step ST11), outputs the partial texts having a difference to the recognition result integrator 206' as a detection result, as step ST12.

Because two server-side voice recognition result candidates 811 and 812 are included in a server side voice recognition result list 813 in the example of FIG. 21, the recognition result candidate comparator compares "SEND E-MAIL TO JOHN HAPPY BIRTHDAY JOHN" and "SEND E-MAIL TO JON HAPPY BIRTHDAY JON" which are the pieces of text information of the candidates, and detects that two portions each having a difference exist and both of the two portions have the same text ("JOHN" in the voice recognition result candidate 811, and "JON" in the voice recognition result candidate 812).

Next, the recognition result integrator 206', in step ST51, determines whether or not it is possible to perform replacement with a proper noun included in the text of a free sentence.

The determination of whether or not it is possible to perform replacement with a proper noun is concretely performed as follows. In the examples of FIGS. 21 and 22, when the client-side voice recognition result candidate 814 "SEND E-MAIL TO JONES" provided by the client-side voice recognizer 202 is inputted, and the server-side voice recognition result candidate list 813 which consists of the server-side voice recognition result candidates 811 and 812 is inputted from the receiver 204, the recognition result integrator determines whether a voice operation command "SEND E-MAIL TO" is included in the text of each of the server-side voice recognition result candidates 811 and 812.

When determining that the voice operation command is included, according to the information about the utterance rule inputted from the input rule determinator 211 (the utterance rule "command+proper noun+free sentence" of the input voice which corresponds to the voice operation command "SEND E-MAIL TO" shown in FIG. 22), the recognition result integrator divides each of the server-side voice recognition result candidates into a text corresponding to a proper noun (in the example of FIG. 21, "JOHN" of the server-side voice recognition result candidate 811, and "JON" of the server-side voice recognition result candidate 812), and a text corresponding to a free sentence (in the example of FIG. 21, "HAPPY BIRTHDAY JOHN" of the server-side voice recognition result candidate 811, and "HAPPY BIRTHDAY JON" of the server-side voice recognition result candidate 812) by using the text of the voice operation command as a reference.

The recognition result integrator further determines whether a portion matching the text of a proper noun exists in the text corresponding to the free sentence (in the example of FIG. 21, the recognition result integrator determines that a portion matching the text of a proper noun ("JOHN" of the voice recognition result candidate 811 and "JON" of the voice recognition result candidate 812) exists in the free sentence). Then, when a portion matching the text of a proper noun exists in the free sentence, the recognition result integrator determines that it is possible to perform replacement with the proper noun.

When determining that it is possible to perform replacement with the proper noun (when YES in step ST51), the recognition result integrator, as step ST52, replaces the proper noun included in the text after division as a free sentence with the corresponding text on the basis of the detection result inputted from the recognition result candidate comparator 205.

In the example of FIG. 21, the recognition result integrator replaces the text "JOHN" corresponding to the proper noun, which is included in the text "HAPPY BIRTHDAY JOHN" after division as a free sentence, with the text "JONES" of the proper noun which is recognized by the client-side voice recognizer 202, to determine "HAPPY BIRTHDAY JONES."

The recognition result integrator 206', as step ST24, combines the text after division and the voice operation command corresponding to the client-side voice recognition result candidate on the basis of the information about the utterance rule inputted from the input rule determinator 211, to decide a voice recognition result.

In the example of FIG. 21, the recognition result integrator decides "SEND E-MAIL TO JONES HAPPY BIRTHDAY JONES", which is acquired by combining the voice operation command "SEND E-MAIL TO" and the proper noun "JONES", and the text "HAPPY BIRTHDAY JONES" corresponding to the free sentence on the basis of the utterance rule "command+proper noun+free sentence", as a voice recognition result.

As mentioned above, the voice recognition system in accordance with this Embodiment 8 can provide the same advantages as those provided by Embodiment 4 also when a voice uttered in English is inputted to the voice recognition device 200".

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

As mentioned above, the voice recognition system and the voice recognition device in accordance with the present invention can be applied to various pieces of equipment equipped with a voice recognition function, and, also when an input including a plurality of intentions is performed, can provide an optimal voice recognition result with a high degree of accuracy.

EXPLANATIONS OF REFERENCE NUMERALS 100 voice recognition server, 101 receiver, 102 server-side voice recognizer, 103 transmitter, 200, 200' voice recognition device, 201 voice inputter, 202 client-side voice recognizer, 203 transmitter, 204 receiver, 205 recognition result candidate comparator, 206, 206', 206" recognition result integrator, 207 outputter, 211 input rule determinator, 212 input rule storage, 221 recognition result candidate corrector, 221a database for correction, and 222 input voice/recognition result storage.

The invention claimed is:

1. A voice recognition system including a server device and a voice recognition device on a client side, which is connected to said server device, wherein
said server device comprises:
a server-side receiver that receives voice data from said voice recognition device;
a server-side voice recognizer that performs voice recognition on said voice data received by said server-side receiver, and generates a plurality of server-side voice recognition result candidates; and
a server-side transmitter that transmits said plurality of server-side voice recognition result candidates generated by said server-side voice recognizer to said voice recognition device, and wherein said voice recognition device comprises:
- a voice inputter that converts a voice into said voice data;
- a client-side voice recognizer that performs voice recognition on said voice data converted by said voice inputter, and generates a client-side voice recognition result candidate;
- a client-side transmitter that transmits said voice data converted by said voice inputter to said server device;
- a client-side receiver that receives said plurality of server-side voice recognition result candidates transmitted by said server-side transmitter,
- a recognition result candidate comparator that compares said plurality of server-side voice recognition result candidates received by said client-side receiver, to detect texts having a difference;
- a recognition result integrator that integrates said client-side voice recognition result candidate and said plurality of server-side voice recognition result candidates by replacing a portion of one of said plurality of server-side voice recognition result candidates with a portion of said client-side voice recognition result candidate based on said client-side voice recognition result candidate, said plurality of server-side voice recognition result candidates, and a detection result provided by said recognition result candidate comparator, to decide a voice recognition result; and
- an outputter that outputs said voice recognition result decided by said recognition result integrator.

2. The voice recognition system according to claim 1, wherein said voice recognition device includes an input rule determinator that compares said client-side voice recognition result candidate with utterance rule patterns in each of which a predetermined key word is brought into correspondence with an utterance rule of said predetermined key word, and determines an utterance rule of said voice data, and wherein said recognition result integrator integrates said client-side voice recognition result candidate and said plurality of server-side voice recognition result candidates based on said client-side voice recognition result candidate, said plurality of server-side voice recognition result candidates, the detection result provided by said recognition result candidate comparator, and the utterance rule determined by said input rule determinator.

3. The voice recognition system according to claim 2, wherein said voice recognition device includes an input voice/recognition result storage that stores said voice data converted by said voice inputter and the voice recognition result decided by said recognition result integrator while bringing them into correspondence with each other, and a recognition result candidate corrector that acquires said plurality of server-side voice recognition result candidates corresponding to said voice data stored in said input voice/recognition result storage and generates a database when said voice recognition device is started, and that also compares the generated database with said plurality of server-side voice recognition result candidates received by said client-side receiver, and wherein said recognition result integrator integrates said client-side voice recognition result candidate and said plurality of server-side voice recognition result candidates based on a comparison result provided by said recognition result candidate corrector.

4. The voice recognition system according to claim 2, wherein said recognition result candidate comparator compares said plurality of said server-side voice recognition result candidates received by said client-side receiver to detect a plurality of texts having a difference, and determines whether the plurality of detected texts show same contents, and said recognition result integrator replaces a detected text with a proper noun based on said plurality of server-side voice recognition result candidates when said recognition result candidate comparator determines that the plurality of detected texts detected show the same contents.

5. The voice recognition system according to claim 1, wherein said recognition result comparator compares said plurality of server-side voice recognition result candidates when said recognition result comparator determines that said plurality of server-side voice recognition result candidates are received from said server device.

6. The voice recognition system according to claim 1, wherein said client-side transmitter transmits said voice data to said server device before said client-side voice recognizer generates said client-side voice recognition result candidate.

7. The voice recognition system according to claim 1, wherein said recognition result integrator decides the voice recognition result without calculating a corresponding numerical score for said client-side voice recognition result candidate and said plurality of server-side voice recognition result candidates.

8. The voice recognition system according to claim 1, wherein said recognition result integrator decides the voice recognition result to be the one of said plurality of server-side voice recognition result candidates when said recognition result candidate comparator does not detect any difference between said plurality of server-side voice recognition result candidates.

9. A voice recognition device on a client side which is connected to a server device having a voice recognition function, said voice recognition device comprising:
- a voice inputter that converts a voice into voice data;
- a client-side voice recognizer that performs voice recognition on said voice data converted by said voice inputter, and generates a client-side voice recognition result candidate;
- a client-side transmitter that transmits said voice data converted by said voice inputter to said server device;
- a client-side receiver that receives a plurality of server-side voice recognition result candidates generated by said server device based on said voice data transmitted by said client-side transmitter;
- a recognition result candidate comparator that compares said plurality of server-side voice recognition result candidates received by said client-side receiver, to detect texts having a difference;
- a recognition result integrator that integrates said client-side voice recognition result candidate and said plurality of server-side voice recognition result candidates by replacing a portion of one of said plurality of server-side voice recognition result candidates with a portion of said client-side voice recognition result candidate based on said client-side voice recognition result candidate, said plurality of server-side voice recognition result candidates, and a detection result provided by said recognition result candidate comparator, to decide a voice recognition result; and
- an outputter that outputs the voice recognition result decided by said recognition result integrator.

10. A voice recognition system including a server device and a voice recognition device on a client side, which is connected to said server device, wherein
said server device comprises:
  a server-side receiver that receives voice data from said voice recognition device;
  a server-side voice recognizer that performs voice recognition on said voice data received by said server-side receiver, and generates a plurality of server-side voice recognition result candidates; and
  a server-side transmitter that transmits said plurality of server-side voice recognition result candidates generated by said server-side voice recognizer to said voice recognition device, and wherein
said voice recognition device comprises:
  a voice inputter that converts a voice into said voice data;
  a client-side voice recognizer that performs voice recognition on said voice data converted by said voice inputter, and generates a client-side voice recognition result candidate;
  a client-side transmitter that transmits said voice data converted by said voice inputter to said server device;
  a client-side receiver that receives said plurality of server-side voice recognition result candidates transmitted by said server-side transmitter;
  a recognition result candidate comparator that compares said plurality of server-side voice recognition result candidates received by said client-side receiver, to detect texts having a difference;
  a recognition result integrator that integrates said client-side voice recognition result candidate and said plurality of server-side voice recognition result candidates, said plurality of server-side voice recognition result candidates, and a detection result provided by said recognition result candidate comparator, to decide a voice recognition result; and
  an outputter that outputs said voice recognition result decided by said recognition result integrator,
wherein said voice recognition device includes an input rule determiner that compares said client-side voice recognition result candidate with utterance rule patterns in each of which a predetermined key word is brought into correspondence with an utterance rule of said predetermined key word, and determines an utterance rule of said voice data, and wherein said recognition result integrator integrates said client-side voice recognition result candidate and said plurality of server-side voice recognition result candidates based on said client-side voice recognition result candidate, said plurality of server-side voice recognition result candidates, the detection result provided by said recognition result candidate comparator, and the utterance rule determined by said input rule determinator.

\* \* \* \* \*